US012677267B2

(12) United States Patent
Xu et al.

(10) Patent No.: US 12,677,267 B2
(45) Date of Patent: Jul. 7, 2026

(54) SLOT IDENTIFICATION FOR SEMI-PERSISTENT SCHEDULING (SPS) AND CONFIGURED GRANT TRANSMISSIONS

(71) Applicant: QUALCOMM Incorporated, San Diego, CA (US)

(72) Inventors: Changlong Xu, Beijing (CN); Jing Sun, San Diego, CA (US); Xiaoxia Zhang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 510 days.

(21) Appl. No.: 17/999,536

(22) PCT Filed: Jul. 7, 2020

(86) PCT No.: PCT/CN2020/100644
§ 371 (c)(1),
(2) Date: Nov. 21, 2022

(87) PCT Pub. No.: WO2022/006741
PCT Pub. Date: Jan. 13, 2022

(65) Prior Publication Data
US 2023/0199745 A1 Jun. 22, 2023

(51) Int. Cl.
*H04W 72/11* (2023.01)
*H04W 72/0446* (2023.01)
*H04W 72/23* (2023.01)

(52) U.S. Cl.
CPC ........ *H04W 72/11* (2023.01); *H04W 72/0446* (2013.01); *H04W 72/23* (2023.01)

(58) Field of Classification Search
CPC ..... H04W 72/11; H04W 72/04; H04W 72/23; H04W 72/231; H04W 72/232; H04W 72/0446; H04W 72/0453
See application file for complete search history.

(56) References Cited

U.S. PATENT DOCUMENTS 8,634,364 B2   1/2014   Barbieri et al.
9,642,157 B2   5/2017   Vajapeyam et al.
(Continued)

FOREIGN PATENT DOCUMENTS

CN   104640159 A   5/2015
CN   104853441 A   8/2015
(Continued)

OTHER PUBLICATIONS

Supplementary European Search Report—EP20944105—Search Authority—The Hague—Feb. 23, 2024.
(Continued)

*Primary Examiner* — Brian T Le
(74) *Attorney, Agent, or Firm* — Holland & Hart LLP

(57) ABSTRACT

This disclosure provides systems, methods, and apparatus, including computer programs encoded on computer storage media, for selecting resources from a set of resources that are semi-persistently scheduled according to a first periodicity based on a supplemental configuration including a second periodicity. A base station and a user equipment (UE) may select resources for transmitting or receiving instances of one or more semi-persistently scheduled transmissions based on selecting resources from the set of resources based on the second periodicity and one or more selection criteria. In some examples, the base station and the UE may select an earliest resource or a next available resource of the set of resources with a period associated with the second periodicity. In some other examples, the base station and the UE may randomly select a resource of the set of resources within a period associated with the second periodicity.

30 Claims, 14 Drawing Sheets

(56) References Cited

U.S. PATENT DOCUMENTS

|  |  |  |  |  |
|---|---|---|---|---|
| 10,624,070 | B2 | 4/2020 | Akkarakaran et al. | |
| 2013/0343355 | A1 * | 12/2013 | Barbieri ................ | H04W 72/23 |
|  |  |  |  | 370/336 |
| 2018/0279357 | A1 | 9/2018 | Zacharias et al. | |

FOREIGN PATENT DOCUMENTS

| | | | |
|---|---|---|---|
| CN | 106792891 | A | 5/2017 |
| CN | 107484254 | A | 12/2017 |
| EP | 2848082 | B1 | 5/2019 |
| WO | WO-2011133708 | | 10/2011 |
| WO | WO-2015200799 | A1 | 12/2015 |
| WO | WO-2018191596 | | 10/2018 |
| WO | WO-2020060805 | A1 | 3/2020 |

OTHER PUBLICATIONS

International Search Report and Written Opinion—PCT/CN2020/100644—ISA/EPO—Apr. 6, 2021.

Samsung: "Semi-Persistent Transmission Support for SL," 3GPP TSG RAN WG1 Meeting #84bis, R1-162677, Apr. 11-15, 2016 (Apr. 15, 2016) section 2 , 6 pages.

* cited by examiner

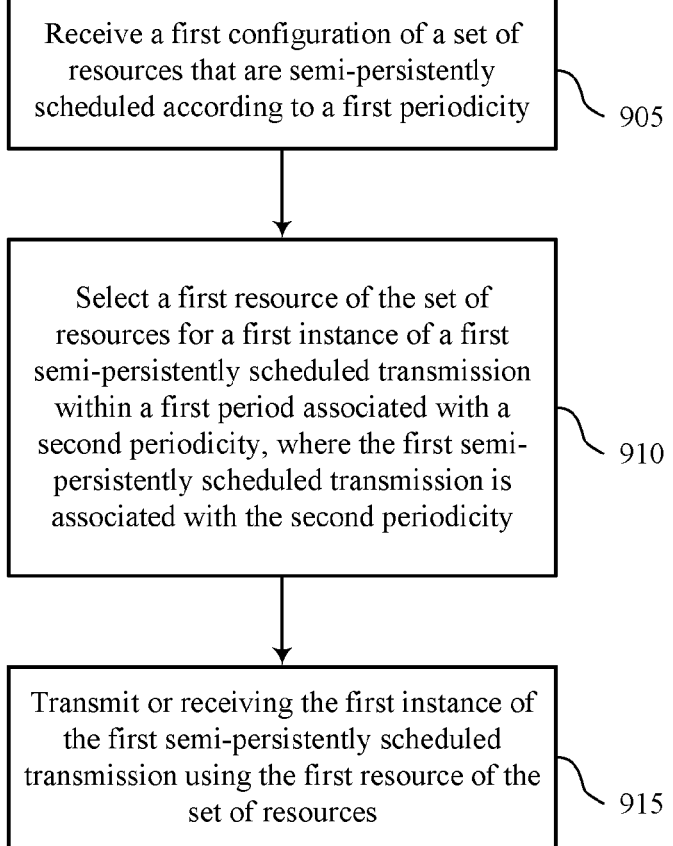

Receive a first configuration of a set of resources that are semi-persistently scheduled according to a first periodicity

905

Select a first resource of the set of resources for a first instance of a first semi-persistently scheduled transmission within a first period associated with a second periodicity, where the first semi-persistently scheduled transmission is associated with the second periodicity

910

Transmit or receiving the first instance of the first semi-persistently scheduled transmission using the first resource of the set of resources

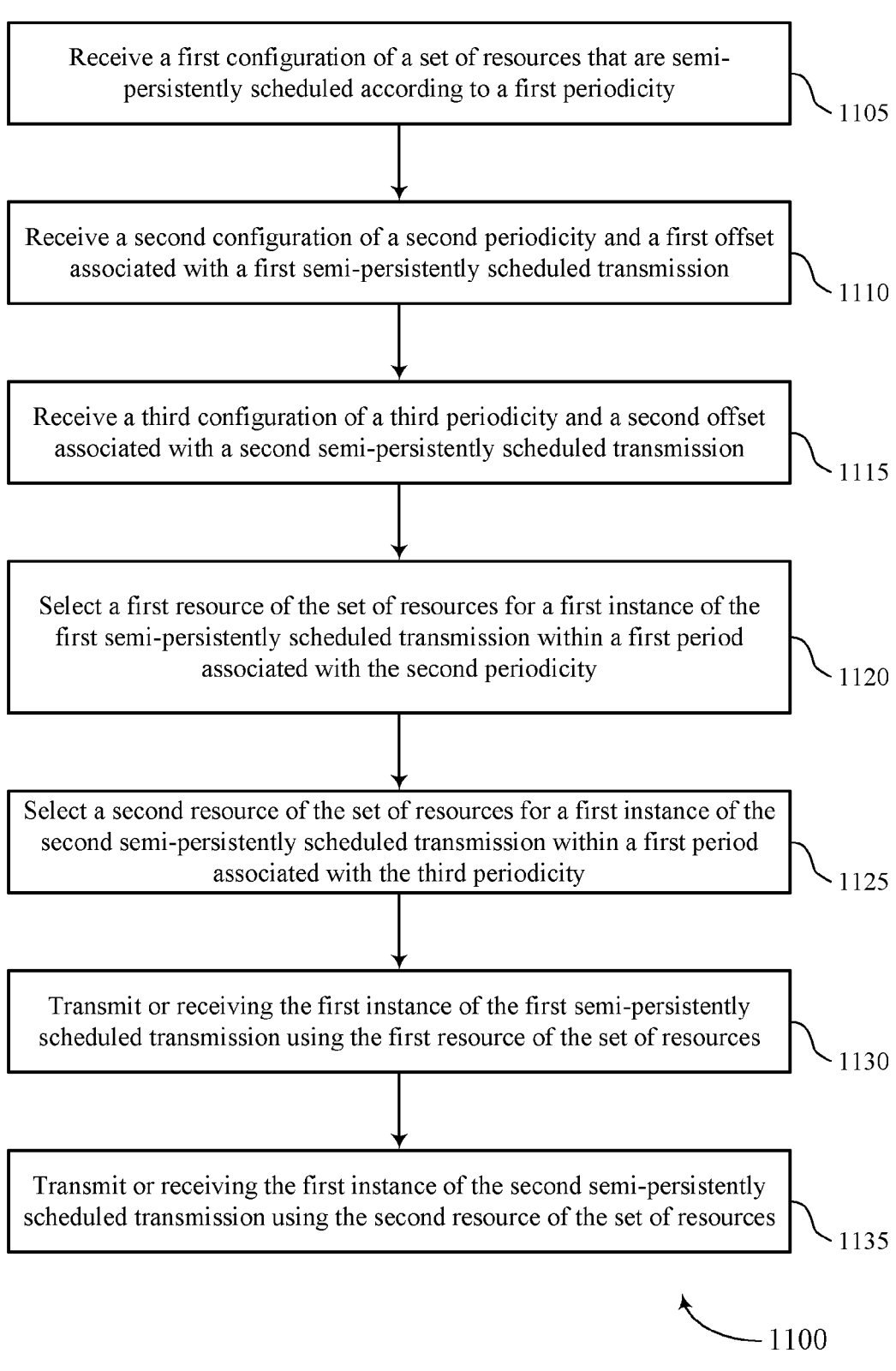

Receive a first configuration of a set of resources that are semi-persistently scheduled according to a first periodicity
1105

Receive a second configuration of a second periodicity and a first offset associated with a first semi-persistently scheduled transmission
1110

Receive a third configuration of a third periodicity and a second offset associated with a second semi-persistently scheduled transmission
1115

Select a first resource of the set of resources for a first instance of the first semi-persistently scheduled transmission within a first period associated with the second periodicity
1120

Select a second resource of the set of resources for a first instance of the second semi-persistently scheduled transmission within a first period associated with the third periodicity
1125

Transmit or receiving the first instance of the first semi-persistently scheduled transmission using the first resource of the set of resources
1130

Transmit or receiving the first instance of the second semi-persistently scheduled transmission using the second resource of the set of resources
1135

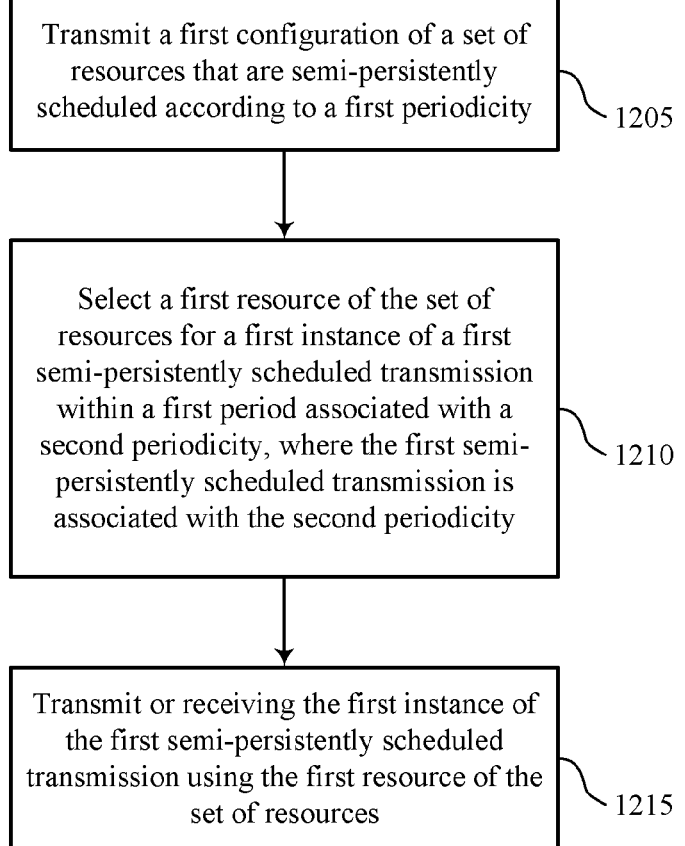

Transmit a first configuration of a set of resources that are semi-persistently scheduled according to a first periodicity ⟍ 1205

Select a first resource of the set of resources for a first instance of a first semi-persistently scheduled transmission within a first period associated with a second periodicity, where the first semi-persistently scheduled transmission is associated with the second periodicity ⟍ 1210

Transmit or receiving the first instance of the first semi-persistently scheduled transmission using the first resource of the set of resources ⟍ 1215

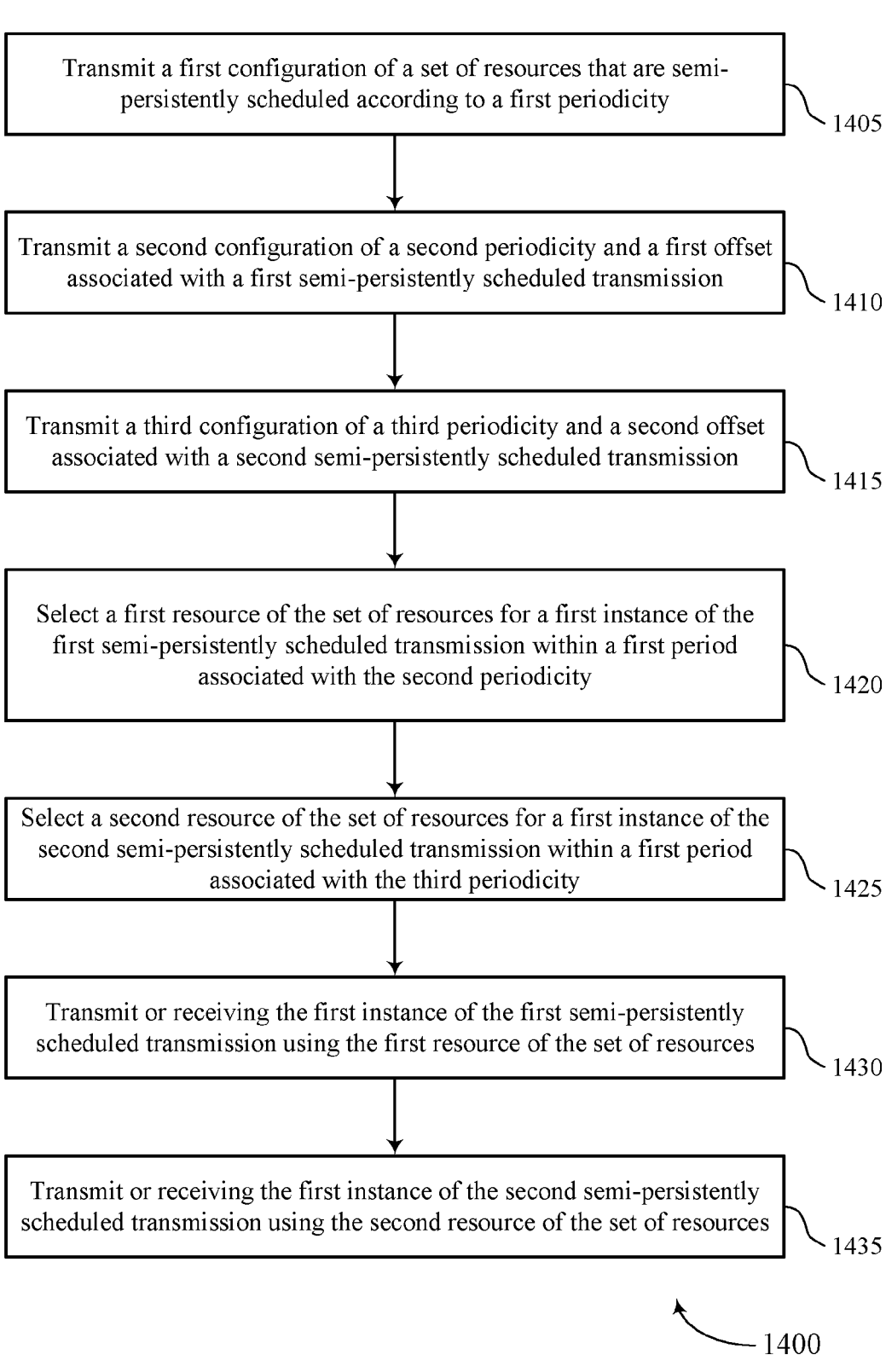

Transmit a first configuration of a set of resources that are semi-persistently scheduled according to a first periodicity          1405

Transmit a second configuration of a second periodicity and a first offset associated with a first semi-persistently scheduled transmission          1410

Transmit a third configuration of a third periodicity and a second offset associated with a second semi-persistently scheduled transmission          1415

Select a first resource of the set of resources for a first instance of the first semi-persistently scheduled transmission within a first period associated with the second periodicity          1420

Select a second resource of the set of resources for a first instance of the second semi-persistently scheduled transmission within a first period associated with the third periodicity          1425

Transmit or receiving the first instance of the first semi-persistently scheduled transmission using the first resource of the set of resources          1430

Transmit or receiving the first instance of the second semi-persistently scheduled transmission using the second resource of the set of resources          1435

SLOT IDENTIFICATION FOR SEMI-PERSISTENT SCHEDULING (SPS) AND CONFIGURED GRANT TRANSMISSIONS

CROSS REFERENCE

The present application is a 371 national stage filing of International PCT Application No. PCT/CN2020/100644 by XU et al. entitled "SLOT IDENTIFICATION FOR SEMI-PERSISTENT SCHEDULING (SPS) AND CONFIGURED GRANT TRANSMISSIONS," filed Jul. 7, 2020, which is assigned to the assignee hereof, and which is expressly incorporated by reference in its entirety herein.

TECHNICAL FIELD

The following relates generally to wireless communications and more specifically to slot identification for semi-persistent scheduling (SPS) and configured grant transmissions.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communications at an apparatus of a user equipment (UE). The method may include receiving a first configuration of a set of resources that are semi-persistently scheduled according to a first periodicity, selecting a first resource of the set of resources for a first instance of a first semi-persistently scheduled transmission within a first period associated with a second periodicity, where the first semi-persistently scheduled transmission is associated with the second periodicity, and transmitting or receiving the first instance of the first semi-persistently scheduled transmission using the first resource of the set of resources.

Another innovative aspect of the subject matter described in this disclosure can be implemented in an apparatus for wireless communications at a UE. The apparatus may include a first interface, a second interface, and a processing system. The first interface may be configured to receive a first configuration of a set of resources that are semi-persistently scheduled according to a first periodicity. The processing system may be configured to select a first resource of the set of resources for a first instance of a first semi-persistently scheduled transmission within a first period associated with a second periodicity, where the first semi-persistently scheduled transmission is associated with the second periodicity. The second interface or the first interface may be configured to transmit or receive the first instance of the first semi-persistently scheduled transmission using the first resource of the set of resources.

Another innovative aspect of the subject matter described in this disclosure can be implemented in another apparatus for wireless communications at a UE. The apparatus may include a processor, memory coupled with the processor, and instructions stored in the memory. The instructions may be executable by the processor to cause the apparatus to receive a first configuration of a set of resources that are semi-persistently scheduled according to a first periodicity, select a first resource of the set of resources for a first instance of a first semi-persistently scheduled transmission within a first period associated with a second periodicity, where the first semi-persistently scheduled transmission is associated with the second periodicity, and transmit or receive the first instance of the first semi-persistently scheduled transmission using the first resource of the set of resources.

Another innovative aspect of the subject matter described in this disclosure can be implemented in another apparatus for wireless communications at a UE. The apparatus may include means for receiving a first configuration of a set of resources that are semi-persistently scheduled according to a first periodicity, selecting a first resource of the set of resources for a first instance of a first semi-persistently scheduled transmission within a first period associated with a second periodicity, where the first semi-persistently scheduled transmission is associated with the second periodicity, and transmitting or receiving the first instance of the first semi-persistently scheduled transmission using the first resource of the set of resources.

Another innovative aspect of the subject matter described in this disclosure can be implemented in a non-transitory computer-readable medium storing code for wireless communications at an apparatus of a UE. The code may include instructions executable by a processor to receive a first configuration of a set of resources that are semi-persistently scheduled according to a first periodicity, select a first resource of the set of resources for a first instance of a first semi-persistently scheduled transmission within a first period associated with a second periodicity, where the first semi-persistently scheduled transmission is associated with the second periodicity, and transmit or receive the first instance of the first semi-persistently scheduled transmission using the first resource of the set of resources.

In some implementations, selecting the first resource of the set of resources for the first instance of the first semi-persistently scheduled transmission within the first period associated with the second periodicity, as implemented in the method, apparatuses, and non-transitory computer-readable medium described herein, can include operations, configurations, features, means, or instructions for selecting an earliest resource of the set of resources after a start of the first period associated with the second periodicity.

In some implementations, selecting the first resource of the set of resources for the first instance of the first semi-persistently scheduled transmission within the first period associated with the second periodicity, as implemented in the method, apparatuses, and non-transitory computer-readable medium described herein, can include operations, configurations, features, means, or instructions for selecting a random resource from a subset of the set of resources within the first period associated with the second periodicity based on a random seed.

In some implementations, the method, apparatuses, and non-transitory computer-readable medium described herein may further include operations, configurations, features, means, or instructions for receiving a second configuration of the second periodicity and a first offset associated with the first semi-persistently scheduled transmission.

In some implementations, the method, apparatuses, and non-transitory computer-readable medium described herein may further include operations, configurations, features, means, or instructions for receiving a third configuration of a second set of resources that may be semi-persistently scheduled according to a third periodicity, receiving a fourth configuration of a fourth periodicity and a second offset associated with a second semi-persistently scheduled transmission, selecting a first resource of the second set of resources for a first instance of the second semi-persistently scheduled transmission within a first period associated with the fourth periodicity, and transmitting or receiving the first instance of the second semi-persistently scheduled transmission using the first resource of the second set of resources.

In some implementations, selecting the first resource of the second set of resources for the first instance of the second semi-persistently scheduled transmission within the first period associated with the fourth periodicity, as implemented in the method, apparatuses, and non-transitory computer-readable medium described herein, can include operations, configurations, features, means, or instructions for selecting an earliest resource of the second set of resources after a start of the first period associated with the fourth periodicity.

In some implementations, selecting the first resource of the second set of resources for the first instance of the second semi-persistently scheduled transmission within the first period associated with the fourth periodicity, as implemented in the method, apparatuses, and non-transitory computer-readable medium described herein, can include operations, configurations, features, means, or instructions for selecting a random resource from a subset of the second set of resources within the first period associated with the fourth periodicity based on a random seed.

In some examples of the method, apparatuses, and non-transitory computer-readable medium described herein, the second offset includes a difference between a starting point of a first period associated with the third periodicity and a starting point of the first period associated with the fourth periodicity.

In some implementations, the method, apparatuses, and non-transitory computer-readable medium described herein may further include operations, configurations, features, means, or instructions for receiving a third configuration of a third periodicity and a second offset associated with a second semi-persistently scheduled transmission, selecting a second resource of the set of resources for a first instance of the second semi-persistently scheduled transmission within a first period associated with the third periodicity, and transmitting or receiving the first instance of the second semi-persistently scheduled transmission using the second resource of the set of resources.

In some implementations, selecting the second resource of the set of resources for the first instance of the second semi-persistently scheduled transmission within the first period associated with the third periodicity, as implemented in the method, apparatuses, and non-transitory computer-readable medium described herein, can include operations, configurations, features, means, or instructions for selecting a next available resource from the set of resources after a start of the first period associated with the third periodicity.

In some implementations, the method, apparatuses, and non-transitory computer-readable medium described herein may further include operations, configurations, features, means, or instructions for determining that a first index of a first device of the UE associated with the first semi-persistently scheduled transmission may be less than a second index of a second device of the UE associated with the second semi-persistently scheduled transmission, and determining an earliest resource of the set of resources after any resource of the set of resources selected for an instance of the first semi-persistently scheduled transmission based on the first index being less than the second index, where selecting the next available resource from the set of resources after the start of the first period associated with the third periodicity may be based on determining the earliest resource of the set of resources after any resource of the set of resources selected for the instance of the first semi-persistently scheduled transmission.

In some implementations, the method, apparatuses, and non-transitory computer-readable medium described herein may further include operations, configurations, features, means, or instructions for determining a first timing of the first period associated with the second periodicity and a second timing of the first period associated with the third periodicity, and determining whether the first timing or the second timing may be an earlier timing, where selecting the next available resource from the set of resources after the start of the first period associated with the third periodicity may be based on determining whether the first timing or the second timing may be the earlier timing.

In some implementations, the method, apparatuses, and non-transitory computer-readable medium described herein may further include operations, configurations, features, means, or instructions for determining that the first timing may be the earlier timing, determining that an earliest resource of the set of resources after the start of the first period associated with the third periodicity may be occupied for an instance of the first semi-persistently scheduled transmission based on determining that the first timing may be the earlier timing, and identifying a next earliest resource after the earliest resource, where selecting the next available resource from the set of resources after the start of the first period associated with the third periodicity may be based on identifying the next earliest resource after the earliest resource.

In some examples of the method, apparatuses, and non-transitory computer-readable medium described herein, a product of the first periodicity and a quantity of devices of the UE may be less than or equal to a lesser of the second periodicity and the third periodicity.

In some examples of the method, apparatuses, and non-transitory computer-readable medium described herein, the first resource and the second resource may be frequency division multiplexed within a first slot.

In some examples of the method, apparatuses, and non-transitory computer-readable medium described herein, the first resource and the second resource may be time division multiplexed within a first slot.

In some examples of the method, apparatuses, and non-transitory computer-readable medium described herein, the first resource and the second resource may be time division multiplexed in a pair of continuous slots.

In some examples of the method, apparatuses, and non-transitory computer-readable medium described herein, the second offset includes a difference between a first starting point of a first period associated with the first periodicity and a second starting point of the first period associated with the third periodicity.

In some examples of the method, apparatuses, and non-transitory computer-readable medium described herein, a product of the first periodicity and a value may be less than or equal to a lesser of the second periodicity and the third periodicity.

In some examples of the method, apparatuses, and non-transitory computer-readable medium described herein, the first offset includes a difference between a first starting point of a first period associated with the first periodicity and a second starting point of the first period associated with the second periodicity.

In some examples of the method, apparatuses, and non-transitory computer-readable medium described herein, a product of the first periodicity and a value may be less than or equal to the second periodicity.

In some examples of the method, apparatuses, and non-transitory computer-readable medium described herein, a quantity of the set of resources may be less than or equal to a product of a value and a ceiling function of a quotient between a quantity of devices of the UE and the value.

One innovative aspect of the subject matter described in this disclosure can be implemented in a method for wireless communications at an apparatus of a base station. The method may include transmitting a first configuration of a set of resources that are semi-persistently scheduled according to a first periodicity, selecting a first resource of the set of resources for a first instance of a first semi-persistently scheduled transmission within a first period associated with a second periodicity, where the first semi-persistently scheduled transmission is associated with the second periodicity, and transmitting or receiving the first instance of the first semi-persistently scheduled transmission using the first resource of the set of resources.

Another innovative aspect of the subject matter described in this disclosure can be implemented in an apparatus for wireless communications at a base station. The apparatus may include a first interface, a second interface, and a processing system. The first interface may be configured to transmit a first configuration of a set of resources that are semi-persistently scheduled according to a first periodicity. The processing system may be configured to select a first resource of the set of resources for a first instance of a first semi-persistently scheduled transmission within a first period associated with a second periodicity, where the first semi-persistently scheduled transmission is associated with the second periodicity. The first interface or the second interface may be configured to transmit or receive the first instance of the first semi-persistently scheduled transmission using the first resource of the set of resources.

Another innovative aspect of the subject matter described in this disclosure can be implemented in another apparatus for wireless communications at a base station. The apparatus may include a processor, memory coupled with the processor, and instructions stored in the memory. The instructions may be executable by the processor to cause the apparatus to transmit a first configuration of a set of resources that are semi-persistently scheduled according to a first periodicity, select a first resource of the set of resources for a first instance of a first semi-persistently scheduled transmission within a first period associated with a second periodicity, where the first semi-persistently scheduled transmission is associated with the second periodicity, and transmit or receive the first instance of the first semi-persistently scheduled transmission using the first resource of the set of resources.

Another innovative aspect of the subject matter described in this disclosure can be implemented in another apparatus for wireless communications at a base station. The apparatus may include means for transmitting a first configuration of a set of resources that are semi-persistently scheduled according to a first periodicity, selecting a first resource of the set of resources for a first instance of a first semi-persistently scheduled transmission within a first period associated with a second periodicity, where the first semi-persistently scheduled transmission is associated with the second periodicity, and transmitting or receiving the first instance of the first semi-persistently scheduled transmission using the first resource of the set of resources.

Another innovative aspect of the subject matter described in this disclosure can be implemented in a non-transitory computer-readable medium storing code for wireless communications at an apparatus of a base station. The code may include instructions executable by a processor to transmit a first configuration of a set of resources that are semi-persistently scheduled according to a first periodicity, select a first resource of the set of resources for a first instance of a first semi-persistently scheduled transmission within a first period associated with a second periodicity, where the first semi-persistently scheduled transmission is associated with the second periodicity, and transmit or receive the first instance of the first semi-persistently scheduled transmission using the first resource of the set of resources.

In some implementations, selecting the first resource of the set of resources for the first instance of the first semi-persistently scheduled transmission within the first period associated with the second periodicity, as implemented in the method, apparatuses, and non-transitory computer-readable medium described herein, can include operations, configurations, features, means, or instructions for selecting an earliest resource of the set of resources after a start of the first period associated with the second periodicity.

In some implementations, selecting the first resource of the set of resources for the first instance of the first semi-persistently scheduled transmission within the first period associated with the second periodicity, as implemented in the method, apparatuses, and non-transitory computer-readable medium described herein, can include operations, configurations, features, means, or instructions for selecting a random resource from a subset of the set of resources within the first period associated with the second periodicity based on a random seed.

In some implementations, the method, apparatuses, and non-transitory computer-readable medium described herein may further include operations, configurations, features, means, or instructions for transmitting a second configuration of the second periodicity and a first offset associated with the first semi-persistently scheduled transmission.

In some implementations, the method, apparatuses, and non-transitory computer-readable medium described herein may further include operations, configurations, features, means, or instructions for transmitting a third configuration of a second set of resources that may be semi-persistently scheduled according to a third periodicity, transmitting a fourth configuration of a fourth periodicity and a second offset associated with a second semi-persistently scheduled transmission, selecting a first resource of the second set of resources for a first instance of the second semi-persistently scheduled transmission within a first period associated with the fourth periodicity, and transmitting or receiving the first instance of the second semi-persistently scheduled transmission using the first resource of the second set of resources.

In some implementations, selecting the first resource of the second set of resources for the first instance of the second semi-persistently scheduled transmission within the first period associated with the fourth periodicity, as implemented in the method, apparatuses, and non-transitory computer-readable medium described herein, can include operations, configurations, features, means, or instructions for selecting an earliest resource of the second set of resources after a start of the first period associated with the fourth periodicity.

In some implementations, selecting the first resource of the second set of resources for the first instance of the second semi-persistently scheduled transmission within the first period associated with the fourth periodicity, as implemented in the method, apparatuses, and non-transitory computer-readable medium described herein, can include operations, configurations, features, means, or instructions for selecting a random resource from a subset of the second set of resources within the first period associated with the fourth periodicity based on a random seed.

In some examples of the method, apparatuses, and non-transitory computer-readable medium described herein, the second offset includes a difference between a start of a first period associated with the third periodicity and a start of the first period associated with the fourth periodicity.

In some implementations, the method, apparatuses, and non-transitory computer-readable medium described herein may further include operations, configurations, features, means, or instructions for transmitting a third configuration of a third periodicity and a second offset associated with a second semi-persistently scheduled transmission, selecting a second resource of the set of resources for a first instance of the second semi-persistently scheduled transmission within a first period associated with the third periodicity, and transmitting or receiving the first instance of the second semi-persistently scheduled transmission using the second resource of the set of resources.

In some implementations, selecting the second resource of the set of resources for the first instance of the second semi-persistently scheduled transmission within the first period associated with the third periodicity, as implemented in the method, apparatuses, and non-transitory computer-readable medium described herein, can include operations, configurations, features, means, or instructions for selecting a next available resource from the set of resources after a start of the first period associated with the third periodicity.

In some implementations, the method, apparatuses, and non-transitory computer-readable medium described herein may further include operations, configurations, features, means, or instructions for determining that a first index of a first device of the UE associated with the first semi-persistently scheduled transmission may be less than a second index of a second device of the UE associated with the second semi-persistently scheduled transmission, and determining an earliest resource of the set of resources after any resource of the set of resources selected for an instance of the first semi-persistently scheduled transmission based on the first index being less than the second index, where selecting the next available resource from the set of resources after the start of the first period associated with the third periodicity may be based on determining the earliest resource of the set of resources after any resource of the set of resources selected for the instance of the first semi-persistently scheduled transmission.

In some implementations, the method, apparatuses, and non-transitory computer-readable medium described herein may further include operations, configurations, features, means, or instructions for determining a first timing of the first period associated with the second periodicity and a second timing of the first period associated with the third periodicity, and determining whether the first timing or the second timing may be an earlier timing, where selecting the next available resource from the set of resources after the start of the first period associated with the third periodicity may be based on determining whether the first timing or the second timing may be the earlier timing.

In some implementations, the method, apparatuses, and non-transitory computer-readable medium described herein may further include operations, configurations, features, means, or instructions for determining that the first timing may be the earlier timing, determining that an earliest resource of the set of resources after the start of the first period associated with the third periodicity may be occupied for an instance of the first semi-persistently scheduled transmission based on determining that the first timing may be the earlier timing, and identifying a next earliest resource after the earliest resource, where selecting the next available resource from the set of resources after the start of the first period associated with the third periodicity may be based on identifying the next earliest resource after the earliest resource.

In some examples of the method, apparatuses, and non-transitory computer-readable medium described herein, a product of the first periodicity and a quantity of devices of the UE may be less than or equal to a lesser of the second periodicity and the third periodicity.

In some examples of the method, apparatuses, and non-transitory computer-readable medium described herein, the first resource and the second resource may be frequency division multiplexed within a first slot.

In some examples of the method, apparatuses, and non-transitory computer-readable medium described herein, the first resource and the second resource may be time division multiplexed within a first slot.

In some examples of the method, apparatuses, and non-transitory computer-readable medium described herein, the first resource and the second resource may be time division multiplexed in a pair of continuous slots.

In some examples of the method, apparatuses, and non-transitory computer-readable medium described herein, the second offset includes a difference between a first starting point of a first period associated with the first periodicity and a second starting point of the first period associated with the third periodicity.

In some examples of the method, apparatuses, and non-transitory computer-readable medium described herein, a product of the first periodicity and a value may be less than or equal to a lesser of the second periodicity and the third periodicity.

In some examples of the method, apparatuses, and non-transitory computer-readable medium described herein, the first offset includes a difference between a first starting point of a first period associated with the first periodicity and a second starting point of the first period associated with the second periodicity.

In some examples of the method, apparatuses, and non-transitory computer-readable medium described herein, a product of the first periodicity and a value may be less than or equal to the second periodicity.

In some examples of the method, apparatuses, and non-transitory computer-readable medium described herein, a quantity of the set of resources may be less than or equal to a product of a value and a ceiling function of a quotient between a quantity of devices of the UE and the value.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIGS. 9-14 show flowcharts illustrating methods that support slot identification for SPS and configured grant transmissions.

Like reference numbers and designations in the various drawings indicate like elements.

DETAILED DESCRIPTION

Figure 1:
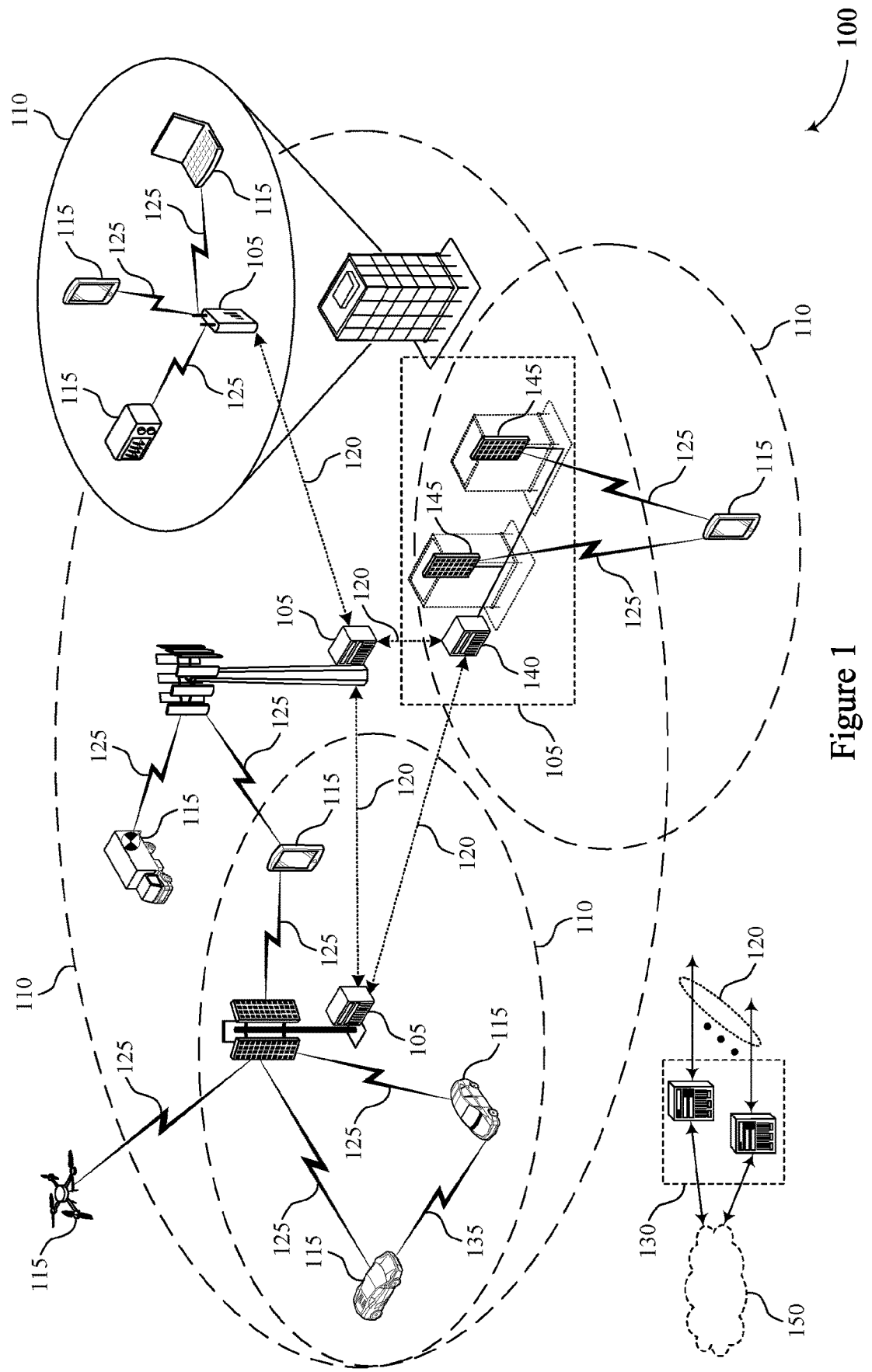
FIGS. 1 and 2 show examples of wireless communications systems that supports slot identification for semi-persistent scheduling (SPS) and configured grant transmissions.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In some wireless communications systems, a base station may configure a user equipment (UE) to regularly transmit or receive signaling without regularly providing the UE with uplink or downlink grants over which to transmit or receive such signaling. For example, to avoid the overhead costs associated with regularly providing a UE with uplink or downlink grants, the base station may configure the UE with parameters for semi-persistent scheduling (SPS) that the UE may use to determine regularly scheduled resources over which the UE may expect to perform communications with the base station. For instance, the base station may allocate a set of semi-persistently scheduled resources to the UE that may be scheduled according to a first periodicity and the UE may use one or more resources from the set of semi-persistently scheduled resources to regularly transmit or receive instances of a semi-persistently scheduled transmission.

In some implementations, the base station and the UE may select which resources from the set of semi-persistently scheduled resources to use for transmitting or receiving instances of the semi-persistently scheduled transmission based on a second periodicity configured by the base station. For example, the base station may initially configure the set of semi-persistently scheduled resources according to the first periodicity, additionally configure the second periodicity, and the base station and the UE may select resources from the set of semi-persistently scheduled resources based on the second periodicity. In some examples, the base station and the UE may select the earliest resource of the set of semi-persistently scheduled resources in each period associated with the second periodicity (for example, each period defined according to the second periodicity). In some other examples, the base station and the UE may select a random resource from a subset of the set of semi-persistently scheduled resources that are included within each period associated with the second periodicity.

The base station may similarly configure resources for multiple semi-persistently scheduled transmissions to or from the UE. In some examples, the base station may configure a different set of semi-persistently scheduled resources and an additional periodicity at the UE for each semi-persistently scheduled transmission between the base station and the UE. In some other examples, the base station may configure a common set of semi-persistently scheduled resources that the base station and the UE may share amongst the multiple semi-persistently scheduled transmissions and the base station may configure an additional periodicity at the UE for each semi-persistently scheduled transmission that the base station and the UE may use to select resources from the common set of semi-persistently scheduled resources for each semi-persistently scheduled transmission. In such examples, the base station and the UE may select resources from the common set of semi-persistently scheduled resources for each semi-persistently scheduled transmission based on an index associated with each semi-persistently scheduled transmission (for example, an index associated with a device of the UE that transmits or receives the semi-persistently scheduled transmission) or based on the relative starting points of the different periods associated with each semi-persistently scheduled transmission. In some further implementations, some or all of the resources of the semi-persistently scheduled resources may be flexible resources and the UE may use a resource location of the set of flexible resources to transmit or receive instances of multiple semi-persistently scheduled transmissions.

Particular implementations of the subject matter described in this disclosure can be implemented to realize one or more of the following potential advantages. For example, by supporting slot or resource identification for semi-persistently scheduled transmissions by selecting resources from a set of semi-persistently scheduled resources according to an additionally configured periodicity, the UE may transmit or receive instances of a semi-persistently scheduled transmission according to periodicities outside of the set of pre-determined periodicities. For example, the set of pre-determined periodicities may include 10 milliseconds (ms), 80 ms, 160 ms, 320 ms, 640 ms, and so on, and, by implementing the techniques described herein, the base station and the UE may communicate semi-persistently scheduled transmissions according to periodicities of any duration (such as 9 ms, 17 ms, 30 ms, or any other duration). As such, the base station and the UE may maintain the low overhead costs associated with SPS configurations while achieving the flexibility to adapt to traffic patterns associated with an application of the UE (that may not conform to a periodicity of the set of pre-determined periodicities). Accordingly, the base station and the UE may facilitate greater spectral efficiency and higher throughput based on the low overhead associated with SPS and also may experience lower latency based on transmitting or receiving instances of semi-persistently scheduled transmissions according a periodicity adapted to the traffic pattern of the application of the UE.

FIG. 1 shows an example of a wireless communications system 100 that supports slot identification for SPS and configured grant transmissions. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier also may have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, where the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $\Delta f_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell also may refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A base station 105 may support one or multiple cells and also may support communications over the one or more cells using one or multiple component carriers.

In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In some other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 also may be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In some other examples, D2D communications are carried out between the UEs 115 without the involvement of a base station 105.

In some systems, the D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which also may be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (for example, by a base station 105 or a UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer also may use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

In some implementations, a UE 115 may transmit or receive instances of one or more semi-persistently scheduled transmissions to or from a base station 105 using selected resources from one or more sets of semi-persistently scheduled resources. For instance, in some examples, the UE 115 may receive, from the base station 105, a first configuration of a set of resources that are semi-persistently scheduled according to a first periodicity (for example, a periodicity $P_L$). In some examples, the base station may select the first periodicity from a pre-determined set of periodicities. The UE 115 may additionally receive, from the base station 105, a second configuration of a second periodicity and an offset associated with a first semi-persistently scheduled transmission. In some examples, the second periodicity, which may be referred to herein as a target periodicity, may be configured by the base station 105 based on the traffic pattern of communications between the base station 105 and the UE 115. The base station 105 and the UE 115 may overlap the first set of resources that are semi-persistently scheduled according to the first periodicity with the second periodicity based on the offset (for example, the base station 105 and the UE 115 may offset an initial period associated with the first periodicity from an initial period associated with the second periodicity based on the configured value of the offset) and may select resources from the set of resources to use for transmitting or receiving instances of the first semi-persistently scheduled transmission based on the second periodicity.

For example, the base station 105 and the UE 115 may overlap the set of resources with a number of periods defined according to or otherwise associated with the second periodicity such that one or more resources of the set of resources are included within each of the number of periods. The base station 105 and the UE 115 may select a resource (for example, a single resource) within each period of the number of periods from the set of resources and use the selected resource to transmit or receive an instance of the first semi-persistently scheduled transmission. In some implementations, the base station 105 and the UE 115 may select the earliest resource within each period. In some other implementations, the base station 105 and the UE 115 may select a random resource within each period. For example, a period associated with the second periodicity may include multiple resources of the set of resources and the base station 105 and the UE 115 may randomly select one of the multiple resources.

Such techniques also may be extended to support multiple semi-persistently scheduled transmissions between the base station 105 and the UE 115. For example, the UE 115 may have multiple devices or components, such as sensors, that share the same communication link with the base station 105 and that are each associated with a different semi-persistently scheduled transmission. As such, the base station 105 may allocate a set of resources and a target periodicity to the UE 115 for each device of the UE 115 and the base station 105 and the UE 115 may select resources for transmitting or receiving instances of the multiple semi-persistently scheduled transmissions from the different sets of resources and based on the different target periodicities. For example, the base station 105 and the UE 115 may select resources from a first set of resources scheduled according to the first periodicity for instances of the first semi-persistently scheduled transmission based on the second periodicity (a first target periodicity) and may select resources from a second set of resources scheduled according to a third periodicity for instances of a second semi-persistently scheduled transmission based on a fourth periodicity (a second target periodicity).

Alternatively, the base station 105 and the UE 115 may use a common set of resources and different target periodicities to select resources from the common set of resources for instances of different semi-persistently scheduled transmissions. In some examples, the base station 105 and the UE 115 may select resources from the common set of resources for instances of the different semi-persistently scheduled transmissions based on an index of the device associated with each semi-persistently scheduled transmission (for example, the index of the device of the UE 115 that transmits or receives each semi-persistently scheduled transmission) or based on which semi-persistently scheduled transmission has a period with an earlier starting point. In some implementations, the resources of the common set of resources may be flexible resources and the base station 105 and the UE 115 may determine to employ frequency division multiplexing (FDM) or time-division multiplexing (TDM) techniques to transmit or receive instances of different semi-persistently scheduled transmissions at the same resource location (for example, the same slot or in continuous slots).

Figure 2:
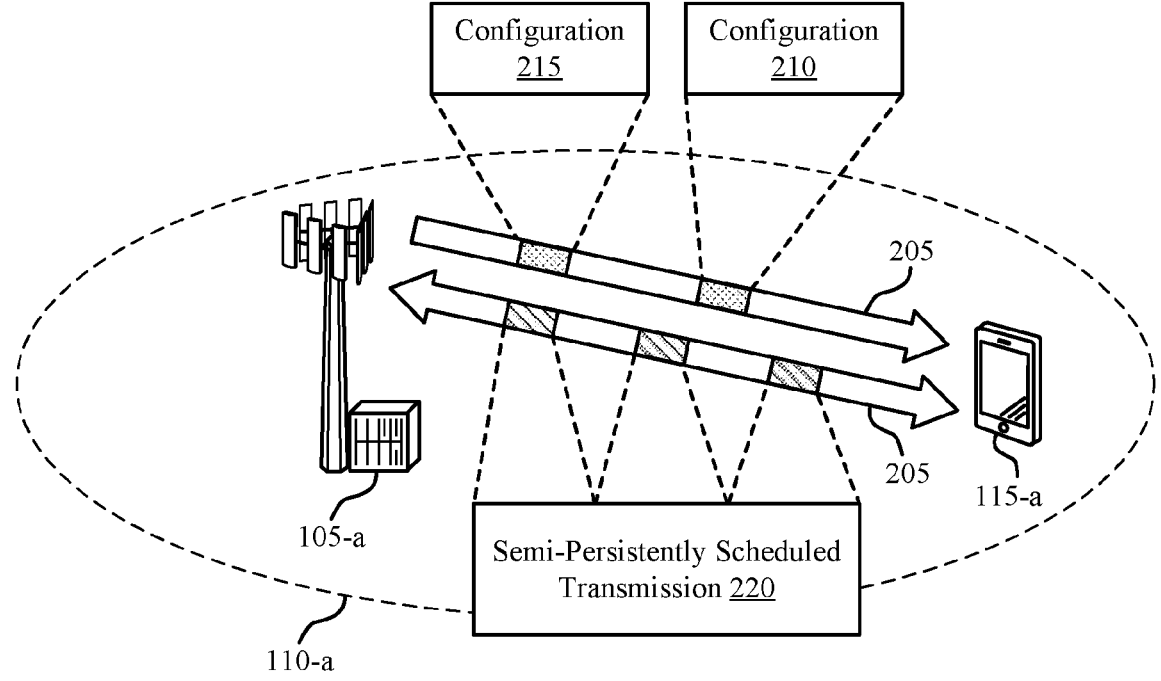

FIG. 2 shows an example of a wireless communications system 200 that supports slot identification for SPS and configured grant transmissions. In some examples, the wireless communications system 200 may implement aspects of the wireless communications system 100. The wireless communications system 200 may include a base station 105-*a* and a UE 115-*a* that may communicate over a communication link 205 within a geographic coverage area 110-*a*. In some implementations, the base station 105-*a* may provide multiple configurations, namely the configuration 210 and the configuration 215, to configure the base station 105-*a* and the UE 115-*a* to transmit or receive a semi-persistently scheduled transmission 220 according to a periodicity that is based on the traffic pattern between the base station 105-*a* and the UE 115-*a*.

The base station 105-*a* and the UE 115-*a* may use SPS to schedule or otherwise configure or allocate resources for transmitting or receiving signaling without frequent uplink or downlink grants. For instance, the base station 105-*a* may configure the UE 115-*a* with SPS parameters such that the base station 105-*a* may regularly transmit downlink data to the UE 115-*a* without regularly transmitting downlink grants to the UE 115-*a* via downlink control information (DCI). In some examples, the base station 105-*a* may use layer 1 (L1) signalling to activate or deactivate the configured SPS and the UE 115-*a* may use a MAC control element (MAC-CE) to acknowledge such activation or deactivation. The downlink SPS parameters that the base station 105-*a* may include in an SPS-related configuration may include a harq-Code-bookID parameter that indicates the HARQ acknowledgement (ACK) codebook index for the corresponding HARQ-ACK codebook for SPS physical downlink shared channel (PDSCH) and ACK for SPS PDSCH release, a harq-ProcID-Offset parameter that indicates the offset used in deriving the HARQ process identifiers (IDs), an mcs-Table parameter that indicates the modulation and coding scheme (MCS) table that the UE 115-*a* may use for downlink SPS, an n1PUCCH-AN parameter that indicates a HARQ resource for a physical uplink control channel (PUCCH) for downlink SPS, an nrofHARQ-Processes parameter that indicates a number of configured HARQ processes for downlink SPS, a periodicity parameter that indicates a periodicity of allocated resources (such as 10 ms, 20 ms, 32 ms, 40 ms, 64 ms, 80 ms, 128 ms, 160 ms, 320 ms, 640 ms, and so on), and an sps-ConfigIndex parameter that indicates the index of one or multiple SPS configurations.

Additionally, or alternatively, the base station 105-*a* may configure the UE 115-*a* with SPS parameters such that the UE 115-*a* may regularly transmit uplink data to the base station 105-*a* without regularly receiving uplink grants from the base station 105-*a* via DCI. In some examples, the base station 105-*a* may configure such SPS parameters for uplink (for example, configured grant uplink, which may be referred to as CG-UL) at the UE 115-*a* semi-statically, such as via RRC signaling. In some implementations, the base station 105-*a* may configure and activate the SPS parameters via RRC signaling and, as such, may refrain from using DCI activation. Such a configuration may be referred to as an RRC-based configuration or a Type 1 configuration and may use no L1 signaling. In some other implementations, the base station 105-*a* may activate previously configured SPS parameters (for example, SPS parameters previously configured at the UE 115-*a* via RRC signaling) via DCI, which may be referred to as DCI activation. Such a configuration may be referred to as DCI-based activation configuration or a Type 2 configuration.

In some examples, the base station 105-*a* may configure resources at the UE 115-*a* for SPS using a ConfiguredGrant-Config information element. Further, the Type 1 configuration and the Type 2 configuration may include different sets of parameters related to HARQ processes associated with the configured resources. For example, the Type 1 configuration may include a cs-RNTI parameter that indicates a cell-specific (CS) radio network temporary identifier (RNTI) for retransmissions, a periodicity parameter that indicates the periodicity of the configured grant (for example, the configured resources) of the Type 1 configuration, a time-DomainOffset parameter that indicates an offset of a resource with respect a system frame number (SFN) equal to zero in the time domain, a timeDomainAllocation parameter that indicates an allocation of a configured uplink grant in the time domain (the timeDomainAllocation parameter may include a startSymbolAndLength parameter, such as a start and length indicator value (SLIV)), and an nrofHARQ-Processes parameter that indicates the number of HARQ processes for the configured grant. The Type 2 configuration may include a cs-RNTI parameter that indicates a CS-RNTI for activation, deactivation, and retransmission, a periodicity parameter that indicates a periodicity of the configured grant of the Type 2 configuration, and an nrofHARQ-Processes parameter that indicates the number of HARQ processes for the configured grant. The Type 2 configuration also may include additional parameters that the base station 105-*a* may transmit to the UE 115-*a* via L1 signaling, such as an offset parameter associated with the periodicity. The UE 115-*a* may transmit feedback (such as ACK) to the base station 105-*a* via a MAC-CE responsive to L1 signaling activation or deactivation (such as DCI).

In some examples, such use of SPS for downlink or configured grant uplink may result in reduced overhead costs in applications associated with frequent, small data transmissions. The periodicity parameter, however, of such SPS configurations (for downlink SPS or uplink SPS, and for either Type 1 or Type 2) may only indicate a periodicity from a set of pre-determined periodicities, such as a set of periodicities defined by a specification or a set of legacy periodicities. For example, the configured period may be set by several durations based on the pre-determined periodicities, which may include 10 ms, 20 ms, 32 ms, 40 ms, 64 ms, 80 ms, 128 ms, 160 ms, 320 ms, 640 ms, and so on. As such, the base station 105-*a*, using the periodicity parameter, may lack sufficient flexibility for designing a periodicity of a semi-persistently scheduled transmission 220 that is associated with a traffic period that varies or is different than the periodicities included in the set of pre-determined periodicities. For example, some applications, such as industrial IoT applications, may have traffic periods of 9 ms, which may not be included within the set of pre-determined periodicities and, as such, unconfigurable by the base station 105-*a* via the periodicity parameter.

Accordingly, the base station 105-*a* may configure a smaller periodicity (such as a periodicity designed for URLLC applications, including sub-slot level periodicities) that divide evenly into the traffic period associated with the application. For example, for a 9 ms traffic period, the base station 105-*c* may configure a periodicity of 1 ms (because, in part, 1 ms is the largest periodicity that divides evenly into 9 ms). In such examples, the UE 115-*a* may use one out of every nine allocated transmission or reception occasions, which may result in resource inefficiency as well as power inefficiency at the UE 115-*a*. To avoid such resource and power inefficiencies, the base station 105-*a* may configure an arbitrary periodicity (for example, a periodicity of an arbitrary length or duration) at the UE 115-*a* to match the traffic period associated with the application of the UE 115-*a*.

For example, in addition, or as an alternative, to the SPS configurations for configured grant uplink SPS and downlink SPS, the base station 105-*a* may configure a period of an arbitrary number of slots via a periodicityExt parameter. The periodicityExt parameter may indicate an arbitrary period (for example, a period or a periodicity of any length or duration) for SPS in downlink or configured grant uplink. The base station 105-*a* or the UE 115-*a*, or both, may use the periodicityExt parameter to calculate the periodicity for SPS (for example, for downlink SPS) and, as such, the base station 105-*a* or the UE 115-*a*, or both, may ignore the periodicity parameter or field when the periodicityExt parameter is present. In some examples, the periodicityExt parameter may have a value (for example, a length or duration, sometimes denoted as a quantity of slots) based on a subcarrier spacing (SCS). For instance, in examples in which the SCS is equal to 15 kHz, the periodicityExt parameter may have a value between 1 and 640. In examples in which the SCS is equal to 30 kHz, the periodicityExt parameter may have a value between 1 and 1280. In examples in which the SCS is equal to 60 kHz (with either a non-extended, normal cyclic prefix or an extended cyclic prefix), the periodicityExt parameter may have a value between 1 and 2560. In examples in which the SCS is equal to 120 kHz, the periodicityExt parameter may have a value between 1 and 5120.

In some examples, however, such an arbitrary periodicity may be incompatible with the periodicities associated with other semi-persistently scheduled communications, which may result in collisions or cancellation problems with the other communications at the base station 105-*a* or the UE 115-*a*, or both. For example, the base station 105-*a* and the UE 115-*a*, using resources scheduled according to the arbitrary periodicity, may use resources for transmission or reception of an instance of a semi-persistently scheduled transmission 220 that are also scheduled or configured for other communications at the base station 105-*a* or the UE 115-*a*, or both, such as a synchronization signal block (SSB), a transmission over a physical random access channel (PRACH), a channel state information (CSI) reference signal (CSI-RS), a sounding reference signal (SRS), or any combination thereof. Such other communications at the base station 105-*a* or the UE 115-*a* may be transmitted or received according to a more regular time structure than the arbitrary periodicity, such as 10 ms, 20 ms, or other periodicities included within the set of pre-determined periodicities.

In some implementations of the present disclosure, the base station 105-*a* may design a periodicity for a semi-persistently scheduled transmission 220 between the base station 105-*a* and the UE 115-*a* based on the traffic period associated with the application of the UE 115-*a* while avoiding potential collisions with other communications at the base station 105-*a* and the UE 115-*a*. In some examples, the base station 105-*a* may avoid potential collisions with other communications at the base station 105-*a* and the UE 115-*a* based on configuring a set of resources according to a periodicity from the set of pre-determined periodicities, which may be referred to herein as a periodicity $P_L$, and may adapt the periodicity $P_L$ to a periodicity associated with the traffic period of the application of the UE 115-*a* based on additionally configuring a target periodicity $P_i$. In some examples, the base station 105-*a* may configure the set of resources scheduled according to the periodicity $P_L$ at the UE 115-*a* based on transmitting the configuration 210 to the UE 115-*a* and may configure the target periodicity $P_i$ at the UE 115-*a* based on transmitting the configuration 215 to the UE 115-*a*.

In some examples, the target periodicity $P_1$ may be configured with greater flexibility (for example, more floating number flexibility) than the periodicity $P_L$ and may define the nominal resource locations that the base station 105-*a* and the UE 115-*a* may use to transmit or receive the semi-persistently scheduled transmission 220. As such, the base station 105-*a* and the UE 115-*a* may select resources from the set of set resources based on the target periodicity $P_i$. For example, the base station 105-*a* and the UE 115-*a* may overlap the set of resources with the target periodicity $P_i$, select a resource from the set of resources during each period associated with the target periodicity $P_i$, and may use the selected resources to transmit or receive instances of the semi-persistently scheduled transmission 220. Additional details relating to selecting a resource for transmitting or receiving instances of the semi-persistently scheduled transmission 220 are described herein, including with reference to FIG. 3.

Such techniques also may be extended to multiple semi-persistently scheduled transmissions 220 between the base station 105-*a* and the UE 115-*a*. For instance, the UE 115-*a* may include multiple devices (such as components or sensors) and each device may be associated with a different semi-persistently scheduled transmission 220. For example, the UE 115-*a* may transmit or receive data for each device of the UE 115-*a* and, in some examples, each device of the UE 115-*a* may be associated with a different traffic period. As such, in examples in which the base station 105-*a* and the UE 115-*a* communicate multiple semi-persistently scheduled transmissions 220, the base station 105-*a* may configure a different set of resources (where different sets of resources are scheduled according to different periodicities $P_L$ from the set of pre-determined periodicities) and a different target periodicity $P_i$ for each semi-persistently scheduled transmission 220. In some examples, the base station 105-*a* may configure each set of resources within the configuration 210 and each target periodicity $P_i$ within the configuration 215 or, in some other examples, may configure the different sets of resources and the different target periodicities $P_i$ in different configuration messages transmitted to the UE 115-*a*. The base station 105-*a* and the UE 115-*a* may select resources for transmitting or receiving instances of the multiple semi-persistently scheduled transmissions 220 from different sets of resources and based on different target periodicities $P_i$. Such an extension to multiple semi-persistently scheduled transmissions 220 using multiple sets of resources is described in more detail herein, including with reference to FIG. 3.

Alternatively, in some other examples in which the base station 105-*a* and the UE 115-*a* communicate multiple semi-persistently scheduled transmissions 220, the base station 105-*a* may configure a common set of resources from which the base station 105-*a* and the UE 115-*a* may select resources for transmitting or receiving instances of multiple semi-persistently scheduled transmissions 220. For example, the base station 105-*a* may configure a common set of resources that are scheduled according to a periodicity $P_L$ at the UE 115-*a* based on transmitting the configuration 210 to the UE 115-*a* and may configure a different target periodicity $P_i$ for each semi-persistently scheduled transmission 220 at the UE 115-*a* based on transmitting the configuration 215 to the UE 115-*a*. In such examples, the base station 105-*a* and the UE 115-*a* may overlap the set of resources with the multiple target periodicities $P_i$ associated with the multiple semi-persistently scheduled transmissions 220 and may select resources from the set of resources for transmitting or receiving instances of the multiple semi-persistently scheduled transmissions 220 based on one or more selection criteria. For example, the base station 105-*a* and the UE 115-*a* may select resources for transmitting or receiving instances of the multiple semi-persistently scheduled transmissions 220 based on the indexes of each device of the UE 115-*a* associated with one of the semi-persistently scheduled transmissions 220 or based on the relative starting points of the different periods associated with the different target periodicities $P_i$ of the multiple semi-persistently scheduled transmissions 220. Additional details relating to selecting resources from a common set of resources for transmitting or receiving instances of multiple semi-persistently scheduled transmissions 220 are described herein, including with reference to FIG. 4.

In some examples, the set of resources may include flexible resources and, as such, the base station 105-*a* and the UE 115-*a* may select multiple resources for transmitting or receiving instances of multiple semi-persistently scheduled transmissions 220 within a single slot or in continuous slots. The flexible resources may have variable sizes and may include up to an upper limit of instances of semi-persistently scheduled transmissions 220. In some implementations, the base station 105-*a* and the UE 115-*a* may employ an FDM technique to multiplex multiple instances within a single slot. In some other implementations, the base station 105-*a* and the UE 115-*a* may employ a TDM technique to multiplex multiple instances within a single slot or, in some other implementations, may employ a TDM technique to position instances in continuous slots. Additional details relating to transmitting or receiving multiple semi-persistently scheduled transmissions 220 using a set of flexible resources are described herein, including with reference to FIG. 5.

Upon selecting the resources, the base station 105-*a* and the UE 115-*a* may transmit or receive instances of the one or more semi-persistently scheduled transmissions 220 using the selected resources. The base station 105-*a* and the UE 115-*a*, based on selecting resources from a set of resources that are scheduled according to a periodicity of a set of pre-determined periodicities based on an additionally configured target periodicity $P_t$, may more optimally transmit or receive semi-persistently scheduled transmissions according to a periodicity associated with the actual traffic periods of the application of the UE 115-$a$, rather than according to the limited set of pre-determined periodicities. Such enhanced flexibility for SPS configurations may result in more efficient resource usage and lower latency at the base station 105-$a$ and the UE 115-$a$, as well as improved power savings at the UE 115-$a$.

Figure 3:
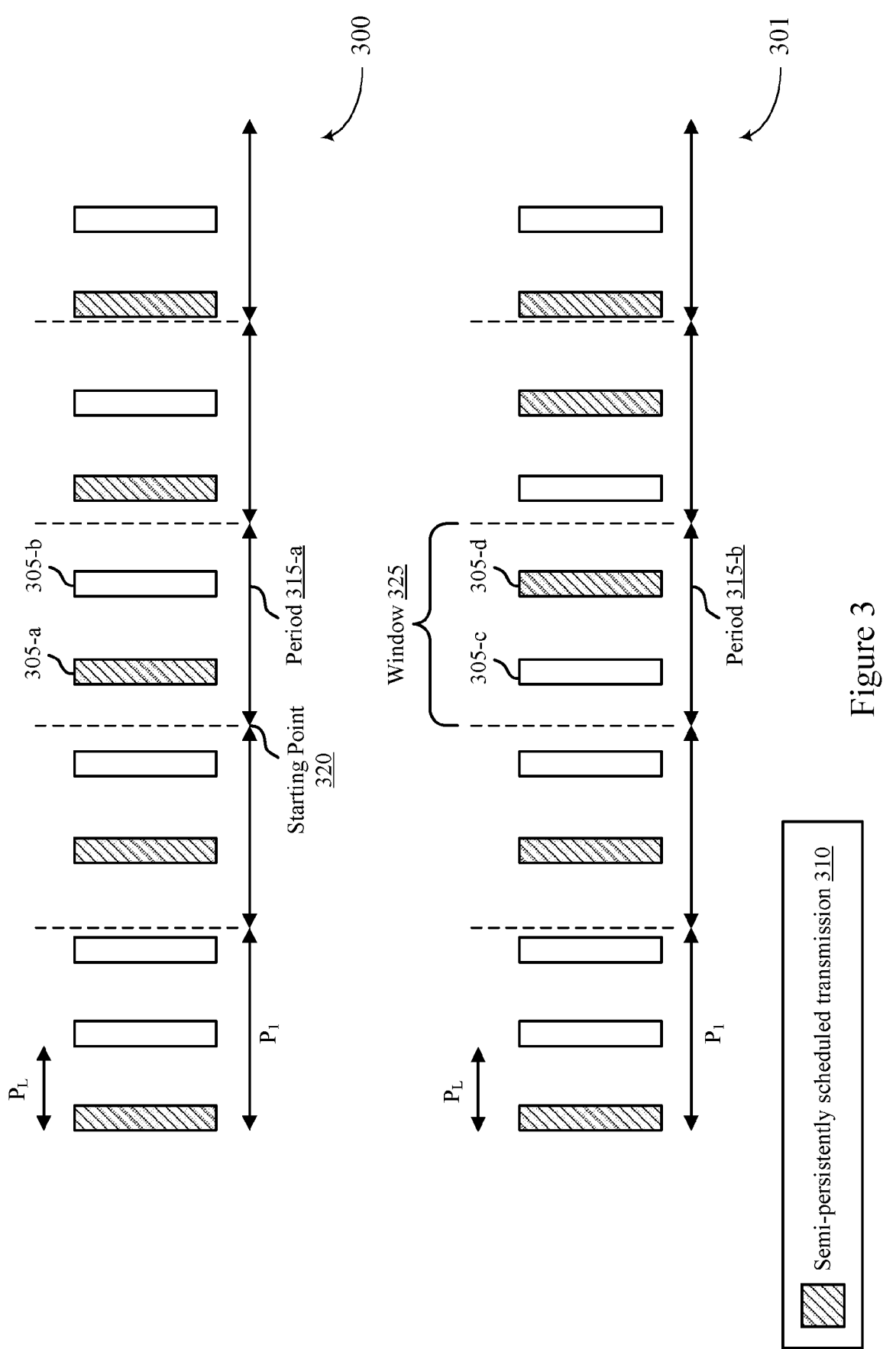
FIGS. 3-5 show examples of communication timelines that support slot identification for SPS and configured grant transmissions.

FIG. 3 shows examples of communication timelines 300 and 301 that support slot identification for SPS and configured grant transmissions. In some examples, the communication timelines 300 and 301 may be implemented to realize aspects of the wireless communications system 100 and the wireless communications system 200. The communication timelines 300 and 301 may illustrate communications between a base station 105 and a UE 115, which may be examples of corresponding devices described herein. In some implementations, the base station 105 and the UE 115 may select resources 305 from a set of resources 305 that are scheduled according to a periodicity $P_L$ based on an additionally configured target periodicity $P_1$ and may use the selected resources 305 to transmit or receive instances of a semi-persistently scheduled transmission 310.

As described in more detail with reference to FIG. 2, the base station 105 may configure the set of resources 305 such that the set of resources 305 are scheduled according to a periodicity $P_L$ and may transmit the configuration to the UE 115. In some aspects, the base station 105-$a$ may determine the periodicity $P_L$ based on selecting a periodicity from a set of pre-determined periodicities. In some specific examples, the base station 105 may configure the first periodicity $P_L$=10 ms. The base station 105 may additionally configure a target periodicity $P_1$ and an offset that the base station 105 and the UE 115 may use to select resources 305 from the set of resources 305 to effectively achieve a periodicity that is more optimal for a traffic period associated with an application of the UE 115 than the first periodicity $P_L$. In some specific examples, the base station 105 may configure the target periodicity $P_1$=22 ms. Although the offset is shown to be equal to zero in the communication timelines 300 and 301, the base station 105 may configure the offset to any value (such as 0.5 ms) to define the difference in time between an initial period associated with the periodicity $P_L$ and an initial period associated with the target periodicity $P_1$. In some aspects, the target periodicity $P_1$ may define the nominal resource locations that the base station 105 and the UE 115 may use to transmit or receive the semi-persistently scheduled transmission 310.

In some examples, the value of the periodicity $P_L$ may be based on the value of the target periodicity $P_1$ and a value C. For example, the periodicity $P_L$ may be defined such that $C*P_L \leq P_1$, where C is an integer value such that C=[1, 2, 3, . . . ]. The value C may correspond to a minimum amount of resources 305 included within each period 315 associated with the target periodicity $P_1$ and, as such, larger values of C may provide for more resources 305 within each period 315 and may satisfy a tighter delay requirement for applications associated with a lower latency requirement. On the other hand, lower values of C may provide for fewer resources 305 within each period 315, which may be sufficient for applications without a tight delay requirement. The bass station 105 or the UE 115, or both, may determine the value C in a similar manner to how the base station 105 or the UE 115 may determine a performance metric (for example, the value C may not be a configuration parameter).

In the examples of the communication timelines 300 and 301, C=2 because there may be at least two resources 305 within each period 315 associated with the target periodicity $P_1$.

In some implementations, the base station 105 and the UE 115 may overlap the set of resources 305 with the target periodicity $P_1$ and select a resource 305 from the set of resources 305 during each period 315 associated with the target periodicity $P_1$. Such a selection process may correspond to selecting an actual resource for each nominal resource defined by the target periodicity $P_1$. In some examples, such as in the example of the communication timeline 300, the base station 105 and the UE 115 may select the first (for example, the earliest) resource 305 within each period 315 associated with the target periodicity $P_1$. In some other examples, such as in the example of the communication timeline 301, the base station 105 and the UE 115 may randomly select a resource 305 within each period 315 associated with the target periodicity $P_1$.

For example, as shown by the communication timeline 300, the base station 105 and the UE 115 may select the next scheduled resource 305 during each period 315 associated with the target periodicity $P_1$. In other words, the base station 105 and the UE 115 may select the earliest resource 305 of the set of resources 305 that is present within each period 315. In some aspects, the set of resources 305 may be referred to as a resource grid and the base station 105 and the UE 115 may select the first resource 305 from the resource grid after the configured pattern (where the configured pattern is defined by the periods 315 associated with the target periodicity $P_1$). In an example, the base station 105 and the UE 115 may identify or otherwise determine a resource 305-$a$ and a resource 305-$b$ follow a starting point 320 of a period 315-$a$ associated with the target periodicity $P_1$, and may select the resource 305-$a$ for transmitting or receiving an instance of the semi-persistently scheduled transmission 310 because the resource 305-$a$ is earlier than the resource 305-$b$. In applications associated with a tighter delay requirement, the base station 105 and the UE 115 may implement such an earliest resource 305 selection procedure with a larger value of C such that the earliest resource 305 after the starting point 320 may be separated by a relatively small amount of time.

As shown by the communication timeline 301, the base station 105 and the UE 115 may randomly select a resource 305 during each period 315 associated with the target periodicity $P_1$. For example, the base station 105 and the UE 115 may randomly select a resource 305 from a subset of the set of resources 305 that are included within a window 325 (for example, within a period 315). In some aspects, the window 325 may start at a first resource 305 of the set of resources 305 after a grid location associated with the target periodicity $P_1$ and the window 325 may have a duration (in time) less than or equal to a period 315 associated with the target periodicity $P_1$. In some examples, the base station 105 and the UE 115 may identify the window 325 within the period 315-$b$, may identify or otherwise determine a resource 305-$c$ and a resource 305-$d$ within the window 325, and randomly select either the resource 305-$c$ or the resource 305-$d$. In some implementations, the base station 105 and the UE 115 may use a random seed (a random seed that is known to both the base station 105 and the UE 115) to select either the resource 305-$c$ or the resource 305-$d$. As shown, the base station 105 and the UE 115 may randomly select the resource 305-$d$ and, accordingly, may use the resource 305-$d$ to transmit or receive an instance of the semi-persistently scheduled transmission 310. Such a random selection procedure may, in some examples, reduce the likelihood for collision in examples in which the set of resources 305 is configured for multiple UEs 115.

The base station 105 and the UE 115 may consider the un-selected resources 305 of the set of resources 305 to be invalid and, as such, may refrain from using such un-selected resources 305 for communications. The base station 105 or the UE 115, or both, may, in some examples, transmit or receive feedback based on transmitting or receiving instances of the semi-persistently scheduled transmission 310 over the selected resources 305. In such examples, the base station 105 or the UE 115, or both, may determine a HARQ index based on the nominal resource location based on the grid associated with the target periodicity $P_1$ if configured grant uplink control information (CG-UCI) is not included. For example, the base station 105 or the UE 115, or both, may determine the HARQ index based on the location of the starting points 320 of the periods 315 associated with the target periodicity $P_1$.

In some implementations, the techniques described with reference to FIG. 3 may be extended to support multiple semi-persistently scheduled transmissions 310 from the UE 115 in examples in which the UE 115 has multiple devices, such as sensors, that may share the same communication link (such as the same MAC or physical layer link) between the UE 115 and the base station 105. Each sensor of the UE 115 may be associated with a different target periodicity $P_i$ and the base station 105 may accordingly configure a semi-persistently scheduled transmission (either for downlink SPS or for configured grant uplink SPS) for each sensor. In some aspects, each target periodicity $P_i$ may correspond to a single periodicity $P_{L\_i}$ and, as such, the base station 105 may configure a set of resources 305 for each of the multiple semi-persistently scheduled transmissions 310 between the base station 105 and the UE 115, where each set of resources 305 is scheduled according to a different periodicity $P_{L\_i}$. In other words, each nominal periodicity (each target periodicity $P_i$) may correspond to one periodicity $P_{L\_i}$ and the base station 105 may configure a set of resources 305 according to the corresponding periodicity $P_{L\_i}$ for each sensor of the UE 115 that has a unique target periodicity $P_i$.

For example, the UE 115 may have two sensors and, as such, the base station 105 may configure a first set of resources 305 scheduled according to a first periodicity $P_{L\_1}$ and a second set of resources 305 scheduled according to a second periodicity $P_{L\_2}$ and may additionally configure a first target periodicity $P_1$ and a second target periodicity $P_2$. The base station 105 and the UE 115 may use the first set of resources 305 scheduled according to the first periodicity $P_{L\_1}$ and the first target periodicity $P_1$ to select resources 305 for transmitting or receiving instances of a first semi-persistently scheduled transmission 310 associated with the first sensor of the UE 115 and may use the second set of resources 305 scheduled according to the $P_{L\_2}$ and the second target periodicity $P_2$ to select resources 305 for transmitting or receiving instances of a second semi-persistently scheduled transmission 310 associated with the second sensor of the UE 115. The base station 105 and the UE 115 may select resources from the first set of resources 305 and the second set of resources 305 based on selecting an earliest resource 305 within each period 315 associated with the corresponding target periodicity (either $P_1$ or $P_2$), as described with reference to the communication timeline 300, or based on selecting a random resource 305 within each period 315 associated with the corresponding target periodicity (either $P_1$ or $P_2$), as described with reference to the communication timeline 301. Such techniques for extending the selection procedures described with reference to the communication timelines 300 and 301 may avoid widespread cancellation in examples in which there is a collision after quantization.

In some other examples in which the base station 105 and the UE 115 may transmit or receive multiple semi-persistent scheduled transmissions 310, the base station 105 may configure a single, common set of resources 305 and additionally configure different target periodicities $P_i$ for each of the multiple semi-persistently scheduled transmissions 310. In such examples, the base station 105 and the UE 115 may select resources 305 for transmitting or receiving instances of the multiple semi-persistent scheduled transmissions 310 from the common set of resources 305, as described in more detail with reference to FIG. 4.

Figure 4:
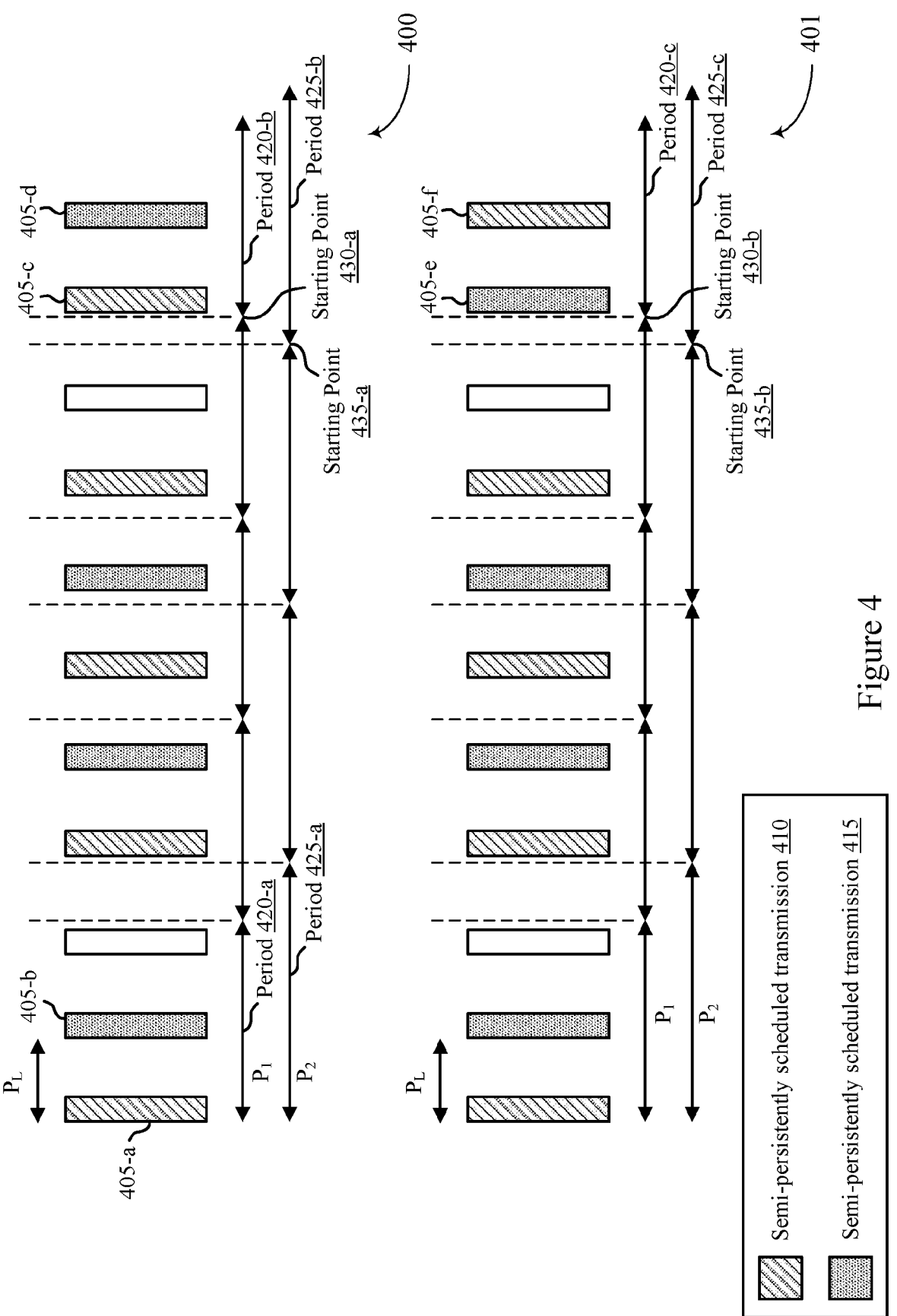

FIG. 4 shows examples of communication timelines 400 and 401 that support slot identification for SPS and configured grant transmissions. In some examples, the communication timelines 400 and 401 may be implemented to realize aspects of the wireless communications system 100 and the wireless communications system 200. The communication timelines 400 and 401 may show communications between a base station 105 and a UE 115, which may be examples of corresponding devices as described herein. In some implementations, the base station 105 may configure a common set of resources 405 for multiple semi-persistently scheduled transmissions and may additionally configure a target periodicity for each of the multiple semi-persistently scheduled transmissions.

As described in more detail with reference to FIG. 2, the base station 105 may configure the set of resources 405 such that the set of resources 405 are scheduled according to a periodicity $P_L$ and may transmit the configuration to the UE 115. In some aspects, the base station 105-a may determine the periodicity $P_L$ based on selecting a periodicity from a set of pre-determined periodicities. The base station 105 may configure the periodicity $P_L$ to any value within the set of pre-determined periodicities, and for example $P_L=10$ ms. The base station 105 may additionally configure a target periodicity $P_1$ and a first offset that the base station 105 and the UE 115 may use to select resources 405 from the set of resources 405 to transmit or receive instances of the semi-persistently scheduled transmission 410. The base station 105 may configure the target periodicity $P_1$ to any value, and for example $P_1=22$ ms. Additionally, the base station 105 may configure a target periodicity $P_2$ and a second offset that the base station 105 and the UE 115 may use to select resources 405 from the set of resources 405 to transmit or receive instances of the semi-persistently scheduled transmission 415. The base station 105 may configure the target periodicity $P_2$ as any value, and for example $P_2=28$ ms. Although the first offset and the second offset are shown to be equal to zero in the communication timelines 400 and 401, the base station 105 may configure the offsets to any value to define the difference in time between an initial period associated with the periodicity $P_L$ and an initial period associated with the target periodicity $P_1$ and the difference in time between the initial period associated with the periodicity $P_L$ and an initial period associated with the target periodicity $P_2$. In some aspects, the target periodicity $P_1$ may define the nominal resource locations that the base station 105 and the UE 115 may use to transmit or receive the semi-persistently scheduled transmission 410 and the target periodicity $P_2$ may define the nominal resource locations that the base station 105 and the UE 115 may use to transmit or receive the semi-persistently scheduled transmission 415.

In some examples, the UE 115 may have N sensors and, as such, the base station 105 may configure at least N resources 405 within a period associated with the shortest target periodicity. For example, the base station 105 may configure the periodicity $P_L$ such that $N*P_L \leq \min(P_1, P_2, \ldots, P_N)$, where $P_1, P_2, \ldots, P_N$ correspond to the target periodicities associated with each of the N sensors of the UE 115. As such, each sensor of the UE 115 may have at least one resource 405 during any given period. As shown in the communication timelines 400 and 401, the UE 115 may have two sensors and may likewise transmit or receive two semi-persistently scheduled transmissions and, accordingly, N=2. In some implementations, the base station 105 and the UE 115 may allocate the resources 405 within a period to the different semi-persistently scheduled transmissions based on the indexes of the corresponding sensors, as described with reference to the communication timeline 400. For example, a first sensor may be associated with the semi-persistently scheduled transmission 410 and a second sensor may be associated with the semi-persistently scheduled transmission 415, and the base station 105 and the UE 115 may allocate the resources 405 to the two semi-persistently scheduled transmissions based on the relative indexing of the first sensor and the second sensor. In some other implementations, the base station 105 and the UE 115 may allocate the first (the earliest) valid or otherwise available resource to each semi-persistently scheduled transmission after a starting point of a period associated with the semi-persistently scheduled transmission, as described with reference to the communication timeline 501.

For example, as shown in the communication timeline 400, the base station 105 and the UE 115 may select resources 405 from the set of resources 405 for the two semi-persistently scheduled transmissions based on the relative indexing of the sensor associated with each semi-persistently scheduled transmission. In some examples, the first sensor associated with the semi-persistently scheduled transmission 410 may have a lower index value than the second sensor associated with the semi-persistently scheduled transmission 415 and, as such, the base station 105 and the UE 115 may prioritize allocating resources for the semi-persistently scheduled transmission 410 over the semi-persistently scheduled transmission 415. For example, an initial period 420-*a* associated with the target periodicity $P_1$ (which is associated with the semi-persistently scheduled transmission 410) and an initial period 425-*a* associated with the target periodicity $P_2$ (which is associated with the semi-persistently scheduled transmission 415) may start at the same time, and the base station 105 and the UE 115 may select the earlier resource 405-*a* for transmitting or receiving an instance of the semi-persistently scheduled transmission 410 and may select the later resource 405-*b* for transmitting or receiving an instance of the semi-persistently scheduled transmission 415. For further example, a period 420-*b* associated with the with the target periodicity $P_1$ may have a starting point 430-*a* that is later in time than a starting point 435-*a* of a period 425-*b* associated with the target periodicity $P_2$, and the base station 105 and the UE 115 may select the earlier resource 405-*c* for transmitting or receiving an instance of the semi-persistently scheduled transmission 410 and may select the later resource 405-*d* for transmitting or receiving an instance of the semi-persistently scheduled transmission 415. As such, in any period 420 associated with the target periodicity $P_1$ of the semi-persistently scheduled transmission 410, the base station 105 and the UE 115 may select the earliest resource 405 for transmitting or receiving an instance of the semi-persistently scheduled transmission

410 because the semi-persistently scheduled transmission 410 is associated with the first sensor having a lower index value than the second sensor associated with the semi-persistently scheduled transmission 415. Likewise, in an arbitrary example of a UE 115 with N sensors, the base station 105 and the UE 115 may select a first resource 405 for an instance of a semi-persistently scheduled transmission 410 associated with the target periodicity $P_1$, a second resource 405 for an instance of a semi-persistently scheduled transmission 415 associated with the target periodicity $P_2$, and an $N^{th}$ resource 405 for an instance of a semi-persistently scheduled transmission associated with the target periodicity $P_N$.

Alternatively, as shown in the communication timeline 401, the base station 105 and the UE 115 may select resources 405 from the set of resources 405 for the two semi-persistently scheduled transmissions based on the relative starting points of two overlapping periods. In other words, the base station 105 and the UE 115 may allocate resources 405 from the set of resources 405 for transmitting or receiving instances of either the semi-persistently scheduled transmission 410 or the semi-persistently scheduled transmission 415 on a first-come, first-serve basis. For example, after the starting point of a period associated with a target periodicity of either the semi-persistently scheduled transmission 410 or the semi-persistently scheduled transmission 415, the base station 105 and the UE 115 may identify a next available (or valid) resource 405 and may select the next available resource 405 for transmitting or receiving an instance of the semi-persistently scheduled transmission. Upon selecting the next available resource 405 for the semi-persistently scheduled transmission, the base station 105 and the UE 115 may mark or otherwise indicate the selected resource as unavailable or invalid (so that the same resource is not selected for instances of two semi-persistently scheduled transmissions).

For example, the base station 105 and the UE 115 may identify that a period 425-*c* associated with a target periodicity $P_2$ (which is associated with the semi-persistently scheduled transmission 415) has a starting point 435-*b* and may determine the next available resource 405 after the starting point 435-*b*. In some examples, the base station 105 and the UE 115 may determine that the next available resource 405 is the resource 405-*e* and, as such, the base station 105 and the UE 115 may select the resource 405-*e* for transmitting or receiving an instance of the semi-persistently scheduled transmission 415. Additionally, the base station 105 and the UE 115 (or the second sensor of the UE 115 associated with the semi-persistently scheduled transmission 415) may indicate that the resource 405-*e* is invalid (for example, occupied or otherwise unavailable for other communications between the base station 105 and the UE 115). The base station 105 and the UE 115 may identify that a period 420-*c* associated with a target periodicity $P_1$ (which is associated with the semi-persistently scheduled transmission 410) has a starting point 430-*b* and may determine the next available resource 405 after the starting point 430-*b*. In some examples, the base station 105 and the UE 115 may determine that the resource 405-*e* is invalid, and thus may determine that the next available resource 405 is the resource 405-*f*. As such, the base station 105 and the UE 115 may select the resource 405-*f* for transmitting or receiving an instance of the semi-persistently scheduled transmission 410. Likewise, the base station 105 and the UE 115 (or the first sensor of the UE 115 associated with the semi-persistently scheduled transmission 410) may indicate that the resource 405-*f* is invalid (for example, occupied or otherwise unavailable for other communications between the base station 105 and the UE 115).

In examples in which the starting point 430 of a period 420 associated with the semi-persistently scheduled transmission 410 is the same as the starting point 435 of a period 425 associated with the semi-persistently scheduled transmission 415 (such as in the initial period 420 and the initial period 425, where the initial period may refer to the left-most period), the base station 105 and the UE 115 may determine to allocate the resources within the smaller of the two periods to the different semi-persistently scheduled transmissions based on the relative indexing of the sensors associated with each semi-persistently scheduled transmission. For example, the first sensor may have a lower index value than the second sensor and, as such, the base station 105 and the UE 115 may select an earlier resource 405 for transmitting or receiving an instance of the semi-persistently scheduled transmission 410 and may select a later resource 405 for transmitting or receiving an instance of the semi-persistently scheduled transmission 415. In some examples, such use of a selection criteria based on the relative starting points of the semi-persistently scheduled transmissions may reduce the gap between the starting point of each period (each irregular period) and the selected resource 405. Further, such techniques for selecting resources 405 based on the relative starting points of the periods associated with each semi-persistently scheduled transmission may avoid widespread cancellation in examples in which there is a collision after quantization.

In some implementations, the set of resources 405 may include fixed resources 405 and, as such, each resource 405 may carry a single instance of a semi-persistently scheduled transmission (either an instance of the semi-persistently scheduled transmission 410 or an instance of the semi-persistently scheduled transmission 415, but not both). In some other implementations, the set of resources 405 may include flexible resources 405 such that a single resource 405 may carry multiple instances (either an instance of the semi-persistently scheduled transmission 410 or an instance of the semi-persistently scheduled transmission 415, or both). Additional details relating to selecting flexible resources 405 for transmitting or receiving instances of multiple semi-persistently scheduled transmissions are described with reference to FIG. 5.

Figure 5:
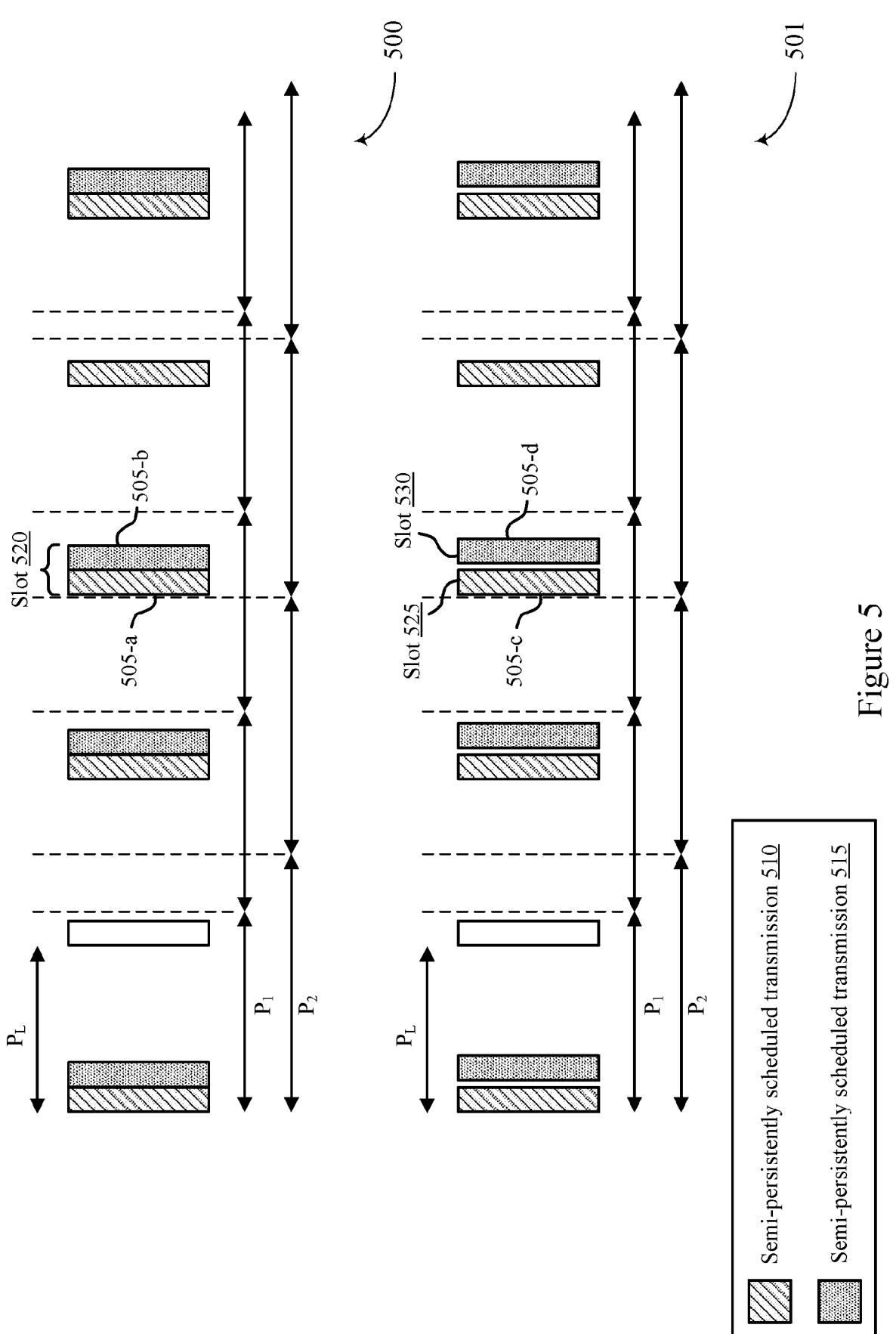

FIG. 5 shows examples of communication timelines 500 and 501 that support slot identification for SPS and configured grant transmissions. In some examples, the communication timelines 500 and 501 may be implemented to realize aspects of the wireless communications system 100 and the wireless communications system 200. The communication timelines 500 and 501 may illustrate communications between a base station 105 and a UE 115, which may be examples of corresponding devices described herein. In some implementations, the base station 105 may configure a set of flexible resources 505 for multiple semi-persistently scheduled transmissions and may additionally configure a target periodicity $P_i$ for each of the multiple semi-persistently scheduled transmissions that the base station 105 and the UE 115 may use to select resources 505 for the semi-persistently scheduled transmissions from the set of flexible resources 505.

In some examples, the base station 105 may configure a size of each flexible resource 505 (where the size of a flexible resource 505 may refer to how many resources 505 including an instance of a semi-persistently scheduled transmission may be included within the flexible resource 505)

based on the periodicity $P_L$ such that a minimum period associated with a target periodicity $P_i$ of a semi-persistently scheduled transmission includes at least one resource for each of the multiple semi-persistently scheduled transmissions. For example, the base station 105 may determine $P_L$ such that $C^*P_L \leq \min(P_1, P_2, \ldots, P_N)$, where $P_1, P_2, \ldots, P_N$ correspond to the target periodicities $P_i$ associated with each of the N sensors of the UE 115 and where C is an integer value such that $C=[1, 2, 3, \ldots]$. As such, the base station 105 may configure at least C resources 505 in a minimum period associated with a semi-persistently scheduled transmission (for example, a minimum sensor period).

The at least C resources 505 within each period may have variable sizes and may include an upper limit of resources 505 that may carry an instance of a semi-persistently scheduled transmission based on the quantity of sensors N of the UE 115 and the value of C. For example, the upper limit of instances of a semi-persistently scheduled transmission that a flexible resource 505 may include may be equal to ceil (N/C). For instance, the variable size of the flexible resources 505 may be determined by the base station 105 and the UE 115 based on the number of resource locations (resource locations that support downlink SPS and configured grant uplink SPS) supported in the periodicity $P_L$ and the quantity of sensors of the UE 115. Accordingly, the base station 105 and the UE 115 may transmit or receive as many as $C^*$ceil(N/C) because there are at least C flexible resources 505 in each period associated with a target periodicity $P_i$, where $C^*$ceil(N/C)$\geq$N. As such, the base station 105 may configure enough flexible resources 505 for an instance of a semi-persistently scheduled transmission for each of the quantity of sensors N of the UE 115 in a minimum period.

In some examples, the UE 115 may have two sensors (N=2) and may transmit or receive instances of two semi-persistently scheduled transmissions including a semi-persistently scheduled transmission 510 and a semi-persistently scheduled transmission 515. The base station 105 and the UE 115 may select resources 505 for transmitting or receiving instances of the semi-persistently scheduled transmission 510 and the semi-persistently scheduled transmission 515 during the period associated with the target periodicity $P_i$ of each semi-persistently scheduled transmission. For example, the base station 105 may configure the semi-persistently scheduled transmission 510 with a target periodicity $P_1$ and may configure the semi-persistently scheduled transmission 515 with a target periodicity $P_2$ and the base station 105 and the UE 115 may select resources 505 from the set of flexible resources 505 for transmitting or receiving instances of the semi-persistently scheduled transmission 510 during each period associated with the target periodicity $P_1$ and resources 505 from the set of flexible resources 505 for transmitting or receiving instances of the semi-persistently scheduled transmission 515 during each period associated with the target periodicity $P_2$. As described herein, the base station 105 may configure the periodicity $P_L$ to any value within the set of pre-determined periodicities, and for example $P_L$=20 ms. Additionally, the base station 105 may configure the target periodicity $P_1$ to any value, and for example $P_1$=22 ms, and the base station 105 may configure the target periodicity $P_2$ as any value, and for example $P_2$=28 ms. Further, although C may be any value, C=1 in the communication timelines 500 and 501.

The base station 105 and the UE 115 may multiplex the resources 505 selected for transmitting or receiving the instances of the semi-persistently scheduled transmission 510 and the semi-persistently scheduled transmission 515 based on selecting resources 505 from the set of flexible resources 505. In some implementations, the base station 105 and the UE 115 may select a resource 505 for transmitting or receiving an instance of the semi-persistently scheduled transmission 510 and may select a resource 505 for transmitting or receiving an instance of the semi-persistently scheduled transmission 515 and may employ an FDM technique to multiplex the two selected resources within a single slot. In some other implementations, the base station 105 and the UE 115 may select a resource 505-*a* for transmitting or receiving an instance of the semi-persistently scheduled transmission 510 and may select a resource 505-*b* for transmitting or receiving an instance of the semi-persistently scheduled transmission 515 and may employ a TDM technique to multiplex the two selected resources within a single slot 520. In some other implementations, the base station 105 and the UE 115 may select a resource 505-*c* for transmitting or receiving an instance of the semi-persistently scheduled transmission 510 and may select a resource 505-*d* for transmitting or receiving an instance of the semi-persistently scheduled transmission 515 and may employ a TDM technique to multiplex the two selected resources over a slot 525 and a slot 530. In some examples, the slot 525 and the slot 530 may be continuous slots such that slot 525 may correspond to a slot n and the slot 530 may correspond to a slot n+1. In such implementations, each resource 505 may be in a separate slot (for example, resource 505-*c* may be within slot 525 and resource 505-*d* may be within slot 530).

Figure 6:
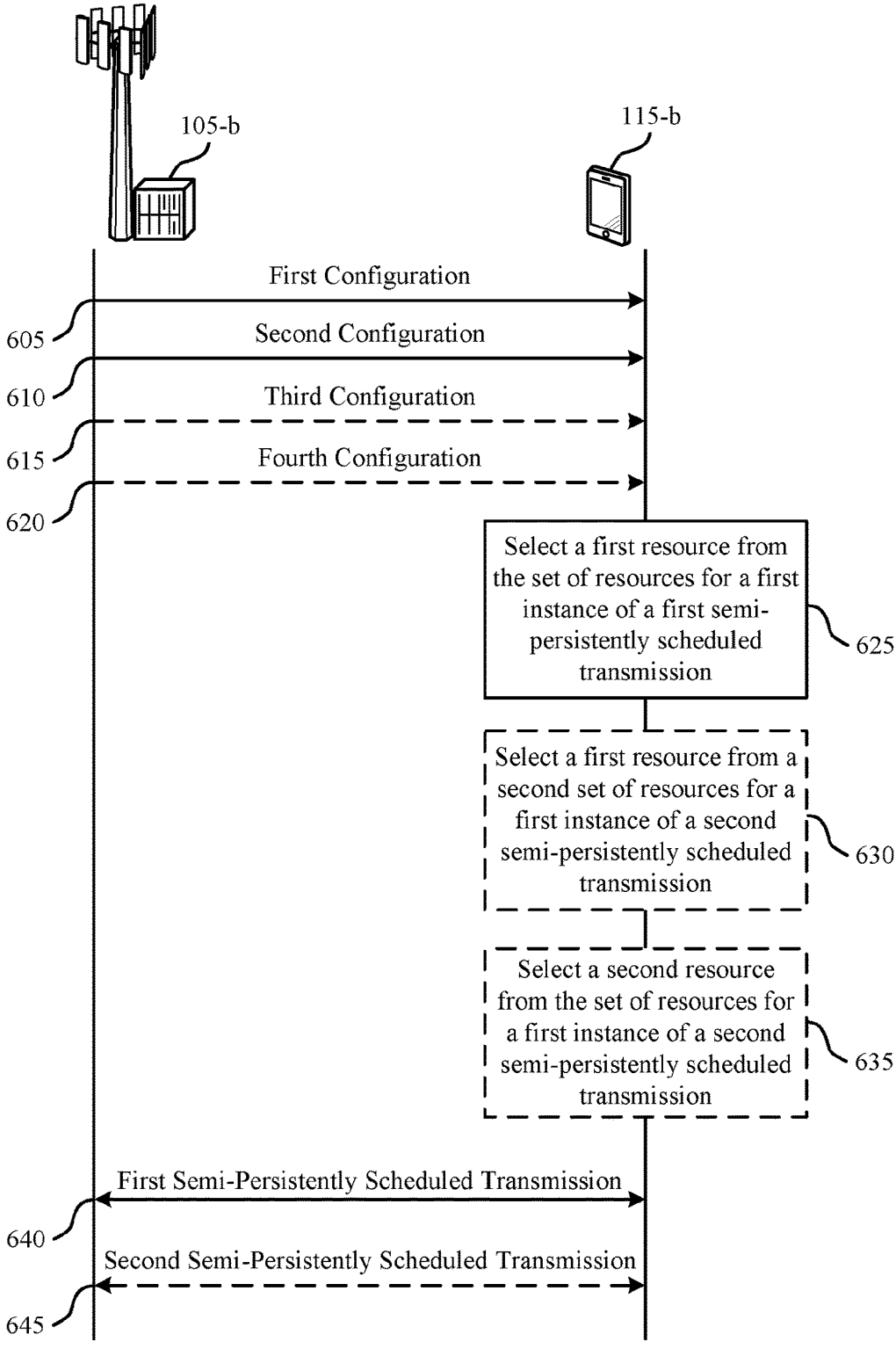
FIG. 6 shows an example of a process flow that supports slot identification for SPS and configured grant transmissions.

FIG. 6 shows an example of a process flow 600 that supports slot identification for SPS and configured grant transmissions. In some examples, the process flow 600 may implement aspects of the wireless communications system 100 and the wireless communications system 200. The process flow 600 may illustrate communications between a base station 105-*b* and a UE 115-*b*, which may be examples of corresponding devices as described herein. In some implementations, the base station 105-*b* may transmit configuration information to the UE 115-*b* to support selection of resources from a set of resources for transmitting or receiving instances of one or more semi-persistently scheduled transmissions between the base station 105-*b* and the UE 115-*b* that may enable the base station 105-*b* and the UE 115-*b* to achieve more flexible periodicities while avoid collisions and cancellations at the base station 105-*b* or the UE 115-*b*, or both. Alternative examples of the following may be implemented, where some processes are performed in a different order than described or are not performed at all. In some implementations, processes may include additional features not mentioned below, or further processes may be added.

At 605, the base station 105-*b* may transmit, to the UE 115-*b*, a first configuration of a set of resources that are semi-persistently scheduled according to a first periodicity. In some examples, the first periodicity may be a periodicity $P_L$ and the base station 105-*b* may select the first periodicity from a set of pre-determined periodicities, such as a set of periodicities defined by a specification.

At 610, the base station 105-*b* may transmit, to the UE 115-*b*, a second configuration of a second periodicity and a first offset associated with a first semi-persistently scheduled transmission. In some examples, the second periodicity may be an example of a target periodicity, such as a periodicity $P_1$, and may be referred to herein as a nominal periodicity. The base station 105-*b* may configure the additional second periodicity to enable the base station 105-*b* and the UE 115-*b* to select resources from the set of resources based on the second periodicity, which may provide added flexibility to adapt a periodicity of a semi-persistently scheduled transmission from the first periodicity (the periodicity $P_L$) to a more optimal periodicity based on the traffic periods of an application of the UE 115-*b*.

At 615, the base station 105-*b* may, in some implementations, transmit, to the UE 115-*b*, a third configuration. In some examples, such as in examples in which the different target periodicities associated with each device (or sensor) of the UE 115-*b* are associated with different periodicities $P_L$, the third configuration may include a second set of resources that are semi-persistently scheduled according to a third periodicity (such as a second periodicity $P_L$ different than the first periodicity). In some other examples, such as in examples in which the different target periodicities associated with each device (or sensor) of the UE 115-*b* are associated with a common periodicity $P_L$, the third configuration may include a third periodicity and a second offset associated with a second semi-persistently scheduled transmission. The third periodicity may be an example of a second target periodicity $P_2$ and the second semi-persistently scheduled transmission may be a different semi-persistently scheduled transmission than the first semi-persistently scheduled transmission (for example, the first semi-persistently scheduled transmission may be associated with a first sensor and the second semi-persistently scheduled transmission may be associated with a second sensor of the UE 115-*b*).

At 620, the base station 105-*b* may, in some implementations, transmit, to the UE 115-*b*, a fourth configuration of a fourth periodicity and a second offset associated with a second semi-persistently scheduled transmission. In some examples, the base station 105-*b* may transmit the fourth configuration in examples in which the third configuration included the second set of resources that are semi-persistently scheduled according to the third periodicity. The fourth periodicity may be an example of a second target periodicity $P_2$ and the second semi-persistently scheduled transmission may be a different semi-persistently scheduled transmission than the first semi-persistently scheduled transmission (for example, the first semi-persistently scheduled transmission may be associated with a first sensor and the second semi-persistently scheduled transmission may be associated with a second sensor of the UE 115-*b*). In examples in which the UE 115-*b* receives a third and a fourth configuration, the base station 105-*b* and the UE 115-*b* may select resources from different sets of resources for transmitting or receiving instances of the first semi-persistently scheduled transmission and for transmitting or receiving instances of the second semi-persistently scheduled transmission.

At 625, the UE 115-*b* may select a first resource from the set of resources for a first instance of the first semi-persistently scheduled transmission within a first period associated with the second periodicity. In some examples, the UE 115-*b* may select the first resources based on identifying an earliest resource of the set of resources after a starting point of the first period associated with the second periodicity. In some other examples, the UE 115-*b* may select a random resource from a subset of the set of resources within the first period associated with the second periodicity based on a random seed. In such examples, the subset of the set of resources may include the resources of the set of resources that are within a window from which the UE 115-*b* may randomly select a resource. In some other examples, the UE 115-*b* may select an earliest resource that is available (for example, valid) after the starting point of the first period associated with the second periodicity. Additional details relating to selecting a resource from the set of resources for an instance of a semi-persistently scheduled transmission are described herein, including with reference to FIGS. 3 and 4.

At 630, the UE 115-*b* may, in some implementations, select a first resource from the second set of resources for a first instance of the second semi-persistently scheduled transmission within a first period associated with the fourth periodicity (for example, the second target periodicity P$_2$). In some aspects, the UE 115-*b* may select the first resource from the second set of resources for an instance of the second semi-persistently scheduled transmission in examples in which the UE 115-*b* receives the third configuration of the second set of resources and the fourth configuration of the fourth periodicity. In some examples, the UE 115-*b* may select the first resource of the second set of resources based on selecting an earliest resource of the second set of resources after a starting point of the first period associated with the fourth periodicity. In some other examples, the UE 115-*b* may select the first resource of the second set of resources based on selecting a random resource from a subset of the second set of resources within the first period associated with the fourth periodicity based on a random seed. In such examples, the subset of the second set of resources may be the resources of the second set of resources that are included within a window from which the UE 115-*b* may randomly select a resource. Additional details relating to selecting a resource from the set of resources for an instance of a semi-persistently scheduled transmission are described herein, including with reference to FIGS. 3 and 4.

At 635, the UE 115-*b* may, in some implementations, select a second resource from the set of resources for a first instance of the second semi-persistently scheduled transmission within a first period associated with the third periodicity (for example, the second target periodicity P$_2$). In some aspects, the UE 115-*b* may select the second resource from the set of resources for the first instance of the second semi-persistently scheduled transmission in examples in which the UE 115-*b* receives the third configuration of the third periodicity. In some examples, the UE 115-*b* may select the second resource from the set of resources based on determining and selecting a next available (for example, valid) resource from the set of resources, which may be based on the relative indexing of the devices associated with each of the first semi-persistently scheduled transmission and the second semi-persistently scheduled transmission or the relative starting points of overlapping periods associated with each of the first semi-persistently scheduled transmission and the second semi-persistently scheduled transmission, or both. Additional details relating to identifying a next available resource are described herein, including with reference to FIG. 5.

At 640, the base station 105-*b* and the UE 115-*b* may transmit or receive the first instance of the first semi-persistently scheduled transmission using the first resource of the set of resources.

At 645, the base station 105-*b* and the UE 115-*b* may, in some implementations, transmit or receive the first instance of the second semi-persistently scheduled transmission using the first resource of the second set of resources. Alternatively, the base station 105-*b* and the UE 115-*b* may, in some implementations, transmit or receive the first instance of the second semi-persistently scheduled transmission using the second resource of the set of resources.

Although the selection methods and techniques are described with reference to FIG. 6 as being performed by the UE 115-*b*, the base station 105-*b* may perform the same selection methods and techniques in addition, or as an alternative, the UE 115-*b*. For example, the base station

Figure 7:
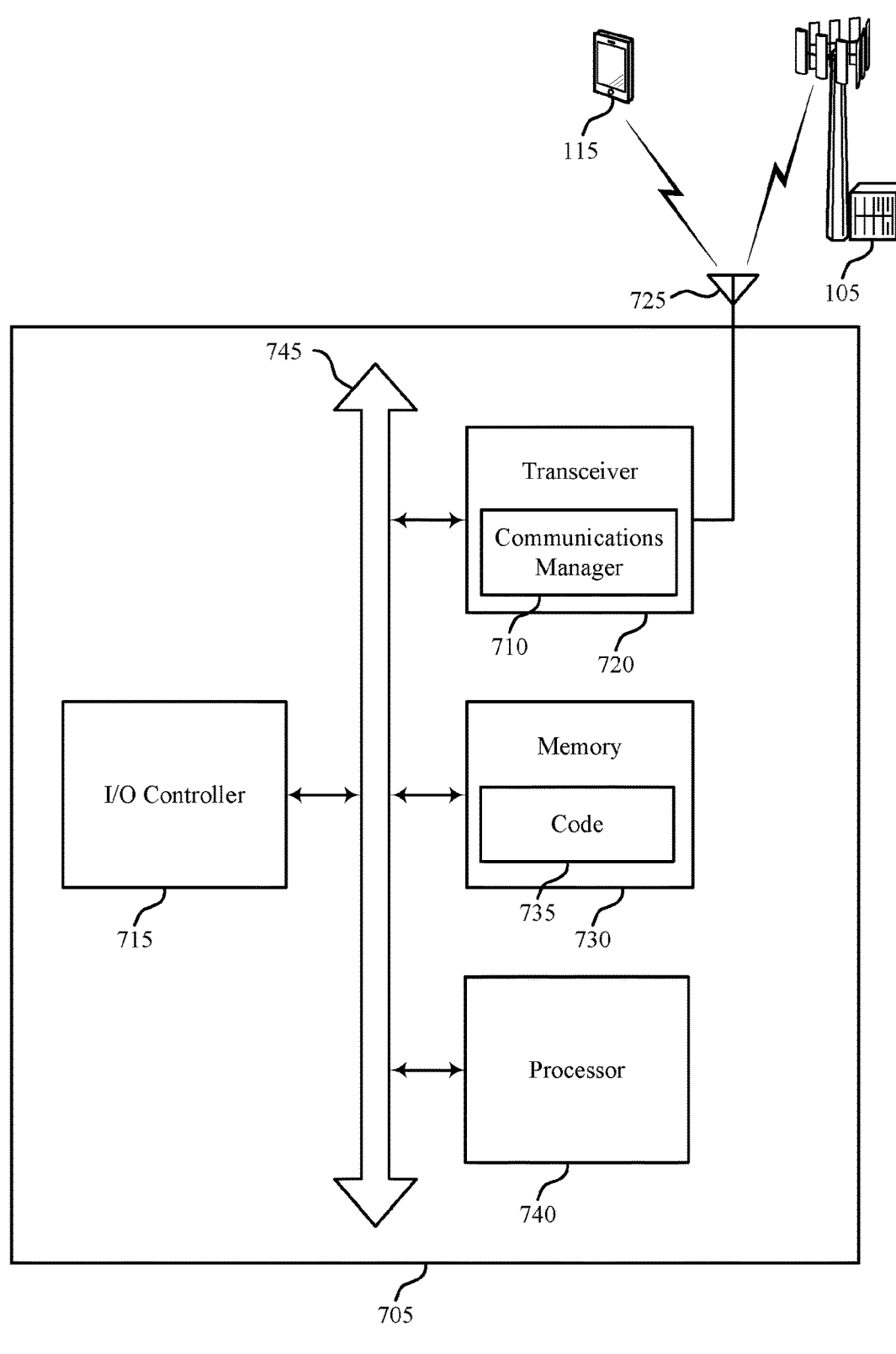
FIGS. 7 and 8 show block diagrams of example devices that support slot identification for SPS and configured grant transmissions.

105-*b* and the UE 115-*b* may perform the same or similar selection techniques and, as such, may determine to use the same resources to transmit or receive semi-persistently scheduled transmissions FIG. 7 shows a block diagram 700 of an example device 705 that supports slot identification for SPS and configured grant transmissions. The device 705 may be an example of or include the components of a UE 115 as described herein. The device 705 may include components for bi-directional voice and data communications including components for transmitting and receiving communications, including a communications manager 710, an input/output (I/O) controller 715, a transceiver 720, an antenna 725, memory 730, and a processor 740. These components may be in electronic communication via one or more buses (for example, bus 745).

The communications manager 710 may receive a first configuration of a set of resources that are semi-persistently scheduled according to a first periodicity. The communications manager 710 may select a first resource of the set of resources for a first instance of a first semi-persistently scheduled transmission within a first period associated with a second periodicity, where the first semi-persistently scheduled transmission is associated with the second periodicity. The communications manager 710 may transmit or receive the first instance of the first semi-persistently scheduled transmission using the first resource of the set of resources.

In some examples, the communications manager 710, when functioning as a processor or a processing system, may obtain the signaling from a receiver, such as the transceiver 720, using a first interface and may output signaling for transmission via a transmitter, such as the transceiver 720, using a second interface.

The I/O controller 715 may manage input and output signals for the device 705. The I/O controller 715 also may manage peripherals not integrated into the device 705. In some examples, the I/O controller 715 may represent a physical connection or port to an external peripheral. In some examples, the I/O controller 715 may utilize an operating system such as iOS®, ANDROID®, MS-DOS®, MS-WINDOWS®, OS/2®, UNIX®, LINUX®, or another known operating system. In some other examples, the I/O controller 715 may represent or interact with a modem, a keyboard, a mouse, a touchscreen, or a similar device. In some examples, the I/O controller 715 may be implemented as part of a processor. In some examples, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 also may include a modem to modulate the packets and provide the modulated packets to the antennas for transmission, and to demodulate packets received from the antennas.

In some examples, the wireless device may include a single antenna 725. However, in some examples the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some examples, the memory 730 may contain, among other things, a basic I/O system (BIOS) which may control basic hardware or software operation such as the interaction with peripheral components or devices.

The processor 740 may include a hardware device, (for example, a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some examples, the processor 740 may be configured to operate a memory array using a memory controller. In some other examples, a memory controller may be integrated into the processor 740. The processor 740 may be configured to execute computer-readable instructions stored in a memory (for example, the memory 730) to cause the device 705 to perform various functions (for example, functions or tasks supporting slot identification for SPS and configured grant transmissions).

The processor 740 may be any one or more suitable processors capable of executing scripts or instructions of one or more software programs stored in the device 705 (such as within the memory 730). For example, the processor 740 may execute the communications manager 710 or the I/O controller 715.

In some implementations, the processor 740 may be a component of a processing system. A processing system may generally refer to a system or series of machines or components that receives inputs and processes the inputs to produce a set of outputs (which may be passed to other systems or components of, for example, the device 705). For example, a processing system of the device 705 may refer to a system including the various other components or subcomponents of the device 705.

The processing system of the device 705 may interface with other components of the device 705, and may process information received from other components (such as inputs or signals), output information to other components, etc. For example, a chip or modem of the device 705 may include a processing system, a first interface to output information, and a second interface to obtain information. In some cases, the first interface may refer to an interface between the processing system of the chip or modem and a transmitter, such that the device 705 may transmit information output from the chip or modem. In some cases, the second interface may refer to an interface between the processing system of the chip or modem and a receiver, such that the device 705 may obtain information or signal inputs, and the information may be passed to the processing system. A person having ordinary skill in the art will readily recognize that the first interface also may obtain information or signal inputs, and the second interface also may output information or signal outputs.

The code 735 may include instructions to implement aspects of the present disclosure, including instructions to support wireless communications. The code 735 may be stored in a non-transitory computer-readable medium such as system memory or other type of memory. In some examples, the code 735 may not be directly executable by the processor 740 but may cause a computer (for example, when compiled and executed) to perform functions described herein.

In some examples, the communications manager 710 may be implemented as an integrated circuit or chipset for a mobile device modem, and a receiver and a transmitter may be implemented as analog components (for example, amplifiers, filters, antennas) coupled with the mobile device modem to enable wireless transmission and reception over one or more bands.

The communications manager 710 as described herein may be implemented to realize one or more potential advantages. In some implementations of the present disclosure, the communications manager 710 may select resources from a set of resources that are scheduled according to a first periodicity from a set of pre-determined periodicities based on an additionally configured target periodicity. The communications manager 710 may use such an additionally configured target periodicity to adapt the first periodicity towards a periodicity that is more optimal for the specific traffic periods associated with the communications manager 710. As such, the communications manager 710 may monitor or attempt to transmit over a more optimal amount of resource occasions than may be provided by the first periodicity, which may result in improved power savings and longer battery life of the device 705.

Figure 8:
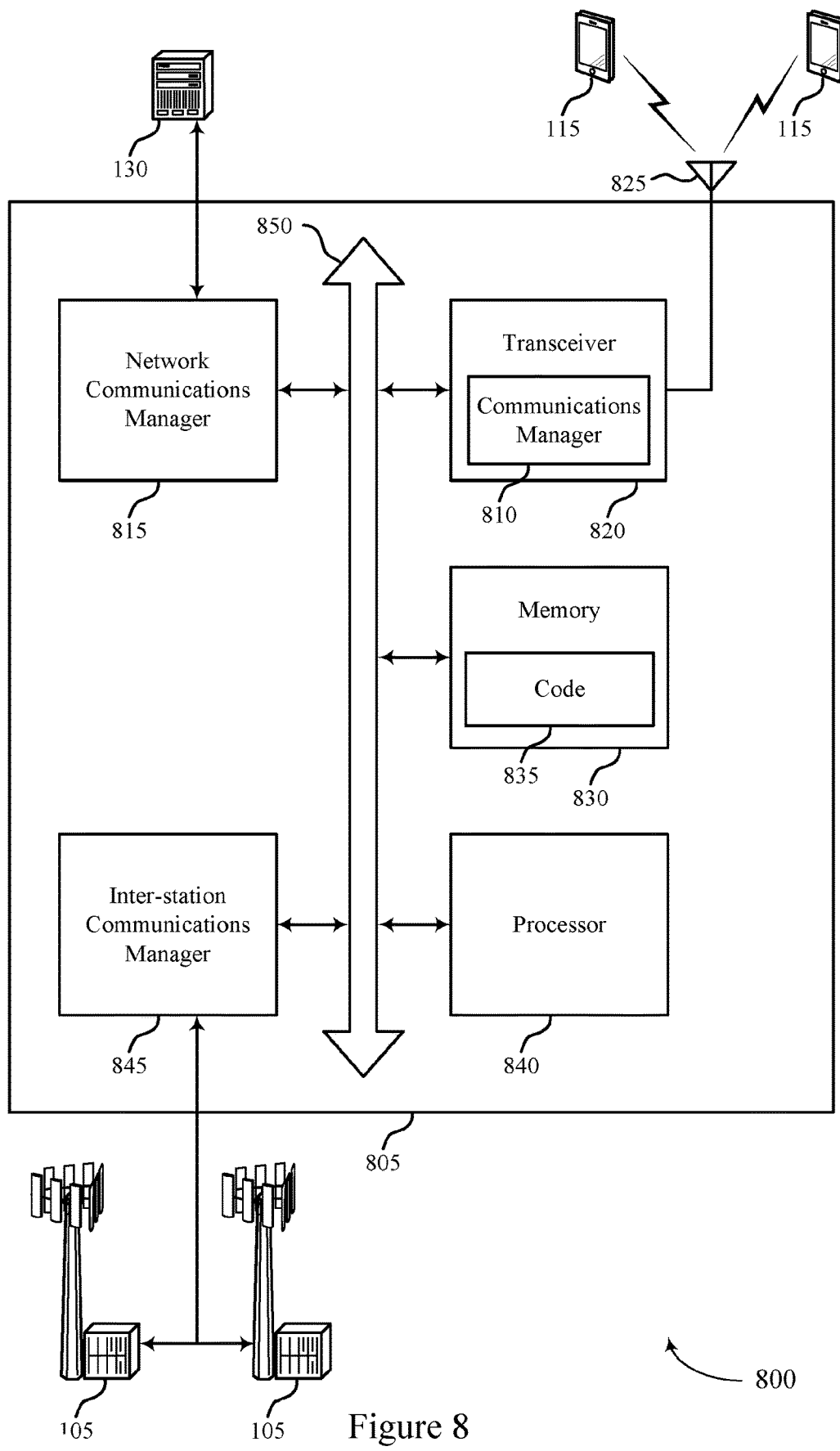

FIG. 8 shows a block diagram 800 of an example device 805 that supports slot identification for SPS and configured grant transmissions. The device 805 may be an example of or include the components of a base station 105 as described herein. The device 805 may include components for bidirectional voice and data communications including components for transmitting and receiving communications, including a communications manager 810, a network communications manager 815, a transceiver 820, an antenna 825, memory 830, a processor 840, and an inter-station communications manager 845. These components may be in electronic communication via one or more buses (for example, bus 850).

The communications manager 810 may transmit a first configuration of a set of resources that are semi-persistently scheduled according to a first periodicity. The communications manager 810 may select a first resource of the set of resources for a first instance of a first semi-persistently scheduled transmission within a first period associated with a second periodicity, wherein the first semi-persistently scheduled transmission is associated with the second periodicity. The communications manager 810 may transmit or receive the first instance of the first semi-persistently scheduled transmission using the first resource of the set of resources.

In some examples, the communications manager 810, when functioning as a processor or a processing system, may obtain the signaling from a receiver, such as the transceiver 820, using a second interface and may output signaling for transmission via a transmitter, such as the transceiver 820, using a first interface.

The network communications manager 815 may manage communications with the core network (for example, via one or more wired backhaul links). For example, the network communications manager 815 may manage the transfer of data communications for client devices, such as one or more UEs 115.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 also may include a modem to modulate the packets and provide the modulated packets to the antennas for transmission, and to demodulate packets received from the antennas.

In some examples, the wireless device may include a single antenna 825. However, in some examples the device may have more than one antenna 825, which may be capable of concurrently transmitting or receiving multiple wireless transmissions.

The memory 830 may include RAM, ROM, or a combination thereof. The memory 830 may store computer-readable code 835 including instructions that, when executed by a processor (for example, the processor 840) cause the device to perform various functions described herein. In some examples, the memory 830 may contain, among other things, a BIOS which may control basic hardware or software operation such as the interaction with peripheral components or devices.

The processor 840 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 840 may be configured to operate a memory array using a memory controller. In some examples, a memory controller may be integrated into processor 840. The processor 840 may be configured to execute computer-readable instructions stored in a memory (for example, the memory 830) to cause the device 805 to perform various functions (for example, functions or tasks supporting slot identification for SPS and configured grant transmissions).

The inter-station communications manager 845 may manage communications with other base station 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communication network technology to provide communication between base stations 105.

The code 835 may include instructions to implement aspects of the present disclosure, including instructions to support wireless communications. The code 835 may be stored in a non-transitory computer-readable medium such as system memory or other type of memory. In some examples, the code 835 may not be directly executable by the processor 840 but may cause a computer (for example, when compiled and executed) to perform functions described herein.

The communications manager 810 may be implemented to realize one or more of the following potential advantages. The communications manager may configure a set of resources at a UE 115 that are scheduled according to a first periodicity and may configure an additional target periodicity at the UE that the communications manager 810 and the UE may use to select resources from the set of resources. As such, the communications manager 810 may achieve greater flexibility in the possible SPS periodicities that the communications manager 810 may configure without risking potential collision or cancellation problems. Accordingly, the communications manager 810 may effectively configure the UE with an SPS periodicity that is more optimal for the traffic periods associated with the application of the UE than the first periodicity. Based on configuring a more optimal periodicity, the communications manager 810 may achieve greater power savings and increased spectral efficiency while maintaining the low overhead costs associated with SPS.

FIG. 9 shows a flowchart illustrating a method 900 that supports slot identification for SPS and configured grant transmissions. The operations of method 900 may be implemented by a UE 115 or its components as described herein. For example, the operations of method 900 may be performed by a communications manager as described with reference to FIG. 7. In some examples, a UE may execute a set of instructions to control the functional elements of the UE to perform the functions described herein. Additionally, or alternatively, a UE may perform aspects of the functions described herein using special-purpose hardware.

At 905, the UE may receive a first configuration of a set of resources that are semi-persistently scheduled according to a first periodicity. The operations of 905 may be performed according to the methods described herein.

At 910, the UE may select a first resource of the set of resources for a first instance of a first semi-persistently scheduled transmission within a first period associated with a second periodicity, where the first semi-persistently scheduled transmission is associated with the second periodicity. The operations of 910 may be performed according to the methods described herein.

At 915, the UE may transmit or receiving the first instance of the first semi-persistently scheduled transmission using the first resource of the set of resources. The operations of 915 may be performed according to the methods described herein.

Figure 10:
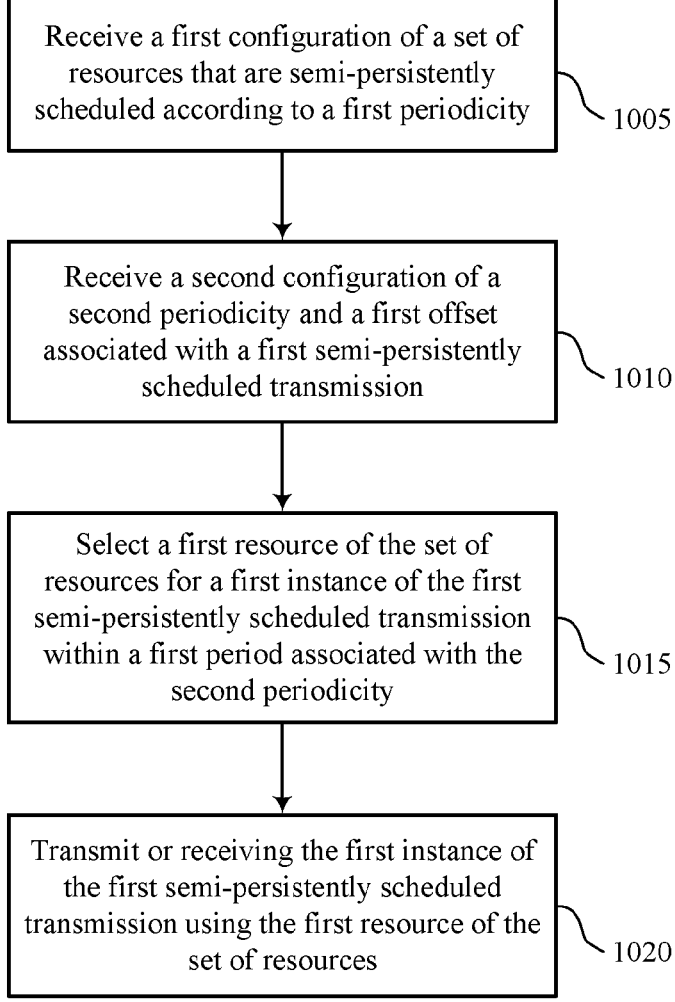

FIG. 10 shows a flowchart illustrating a method 1000 that supports slot identification for SPS and configured grant transmissions. The operations of method 1000 may be implemented by a UE 115 or its components as described herein. For example, the operations of method 1000 may be performed by a communications manager as described with reference to FIG. 7. In some examples, a UE may execute a set of instructions to control the functional elements of the UE to perform the functions described herein. Additionally, or alternatively, a UE may perform aspects of the functions described herein using special-purpose hardware.

At 1005, the UE may receive a first configuration of a set of resources that are semi-persistently scheduled according to a first periodicity. The operations of 1005 may be performed according to the methods described herein.

At 1010, the UE may receive a second configuration of a second periodicity and a first offset associated with a first semi-persistently scheduled transmission. The operations of 1010 may be performed according to the methods described herein.

At 1015, the UE may select a first resource of the set of resources for a first instance of the first semi-persistently scheduled transmission within a first period associated with the second periodicity. The operations of 1015 may be performed according to the methods described herein.

At 1020, the UE may transmit or receiving the first instance of the first semi-persistently scheduled transmission using the first resource of the set of resources. The operations of 1020 may be performed according to the methods described herein.

FIG. 11 shows a flowchart illustrating a method 1100 that supports slot identification for SPS and configured grant transmissions. The operations of method 1100 may be implemented by a UE 115 or its components as described herein. For example, the operations of method 1100 may be performed by a communications manager as described with reference to FIG. 7. In some examples, a UE may execute a set of instructions to control the functional elements of the UE to perform the functions described herein. Additionally, or alternatively, a UE may perform aspects of the functions described herein using special-purpose hardware.

At 1105, the UE may receive a first configuration of a set of resources that are semi-persistently scheduled according to a first periodicity. The operations of 1105 may be performed according to the methods described herein.

At 1110, the UE may receive a second configuration of a second periodicity and a first offset associated with a first semi-persistently scheduled transmission. The operations of 1110 may be performed according to the methods described herein.

At 1115, the UE may receive a third configuration of a third periodicity and a second offset associated with a second semi-persistently scheduled transmission. The operations of 1115 may be performed according to the methods described herein.

At 1120, the UE may select a first resource of the set of resources for a first instance of the first semi-persistently scheduled transmission within a first period associated with the second periodicity. The operations of 1120 may be performed according to the methods described herein.

At 1125, the UE may select a second resource of the set of resources for a first instance of the second semi-persistently scheduled transmission within a first period associated with the third periodicity. The operations of 1125 may be performed according to the methods described herein.

At 1130, the UE may transmit or receiving the first instance of the first semi-persistently scheduled transmission using the first resource of the set of resources. The operations of 1130 may be performed according to the methods described herein.

At 1135, the UE may transmit or receiving the first instance of the second semi-persistently scheduled transmission using the second resource of the set of resources. The operations of 1135 may be performed according to the methods described herein.

FIG. 12 shows a flowchart illustrating a method 1200 that supports slot identification for SPS and configured grant transmissions. The operations of method 1200 may be implemented by a base station 105 or its components as described herein. For example, the operations of method 1200 may be performed by a communications manager as described with reference to FIG. 8. In some examples, a base station may execute a set of instructions to control the functional elements of the base station to perform the functions described herein. Additionally, or alternatively, a base station may perform aspects of the functions described herein using special-purpose hardware.

At 1205, the base station may transmit a first configuration of a set of resources that are semi-persistently scheduled according to a first periodicity. The operations of 1205 may be performed according to the methods described herein.

At 1210, the base station may select a first resource of the set of resources for a first instance of a first semi-persistently scheduled transmission within a first period associated with a second periodicity, where the first semi-persistently scheduled transmission is associated with the second periodicity. The operations of 1210 may be performed according to the methods described herein.

At 1215, the base station may transmit or receiving the first instance of the first semi-persistently scheduled transmission using the first resource of the set of resources. The operations of 1215 may be performed according to the methods described herein.

Figure 13:
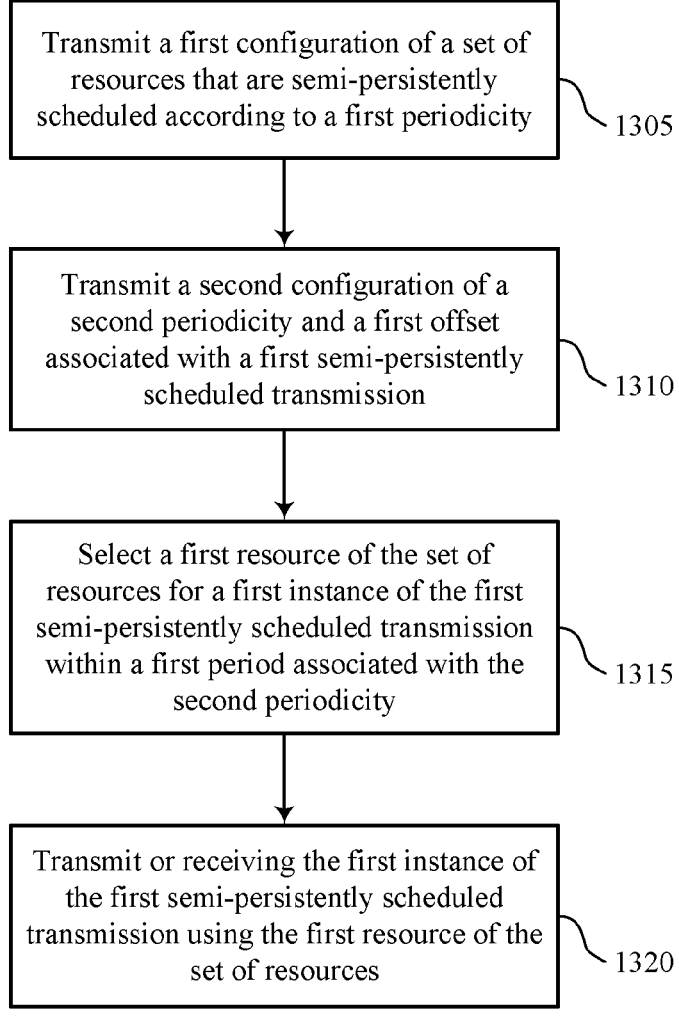

FIG. 13 shows a flowchart illustrating a method 1300 that supports slot identification for SPS and configured grant transmissions. The operations of method 1300 may be implemented by a base station 105 or its components as described herein. For example, the operations of method 1300 may be performed by a communications manager as described with reference to FIG. 8. In some examples, a base station may execute a set of instructions to control the functional elements of the base station to perform the functions described herein. Additionally, or alternatively, a base station may perform aspects of the functions described herein using special-purpose hardware.

At 1305, the base station may transmit a first configuration of a set of resources that are semi-persistently scheduled according to a first periodicity. The operations of 1305 may be performed according to the methods described herein.

At 1310, the base station may transmit a second configuration of a second periodicity and a first offset associated with a first semi-persistently scheduled transmission. The operations of 1310 may be performed according to the methods described herein.

At 1315, the base station may select a first resource of the set of resources for a first instance of the first semi-persistently scheduled transmission within a first period associated with the second periodicity, where the first semi-persistently scheduled transmission is associated with the second periodicity. The operations of 1315 may be performed according to the methods described herein.

At 1320, the base station may transmit or receiving the first instance of the first semi-persistently scheduled transmission using the first resource of the set of resources. The operations of 1320 may be performed according to the methods described herein.

FIG. 14 shows a flowchart illustrating a method 1400 that supports slot identification for SPS and configured grant transmissions. The operations of method 1400 may be implemented by a base station 105 or its components as described herein. For example, the operations of method 1400 may be performed by a communications manager as described with reference to FIG. 8. In some examples, a base station may execute a set of instructions to control the functional elements of the base station to perform the functions described herein. Additionally, or alternatively, a base station may perform aspects of the functions described herein using special-purpose hardware.

At 1405, the base station may transmit a first configuration of a set of resources that are semi-persistently scheduled according to a first periodicity. The operations of 1405 may be performed according to the methods described herein.

At 1410, the base station may transmit a second configuration of a second periodicity and a first offset associated with a first semi-persistently scheduled transmission. The operations of 1410 may be performed according to the methods described herein.

At 1415, the base station may transmit a third configuration of a third periodicity and a second offset associated with a second semi-persistently scheduled transmission. The operations of 1415 may be performed according to the methods described herein.

At 1420, the base station may select a first resource of the set of resources for a first instance of the first semi-persistently scheduled transmission within a first period associated with the second periodicity, where the first semi-persistently scheduled transmission is associated with the second periodicity. The operations of 1420 may be performed according to the methods described herein.

At 1425, the base station may select a second resource of the set of resources for a first instance of the second semi-persistently scheduled transmission within a first period associated with the third periodicity. The operations of 1425 may be performed according to the methods described herein.

At 1430, the base station may transmit or receiving the first instance of the first semi-persistently scheduled transmission using the first resource of the set of resources. The operations of 1430 may be performed according to the methods described herein.

At 1435, the base station may transmit or receiving the first instance of the second semi-persistently scheduled transmission using the second resource of the set of resources. The operations of 1435 may be performed according to the methods described herein.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a DSP, an ASIC, an FPGA or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, electrically erasable programmable ROM (EEPROM), compact disc (CD)-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes CD, laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can, in some examples, be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some examples, the actions recited in the claims can be performed in a different order and still achieve desirable results.

47
48

What is claimed is:

1. An apparatus for wireless communication at a user equipment (UE), comprising:
a processing system that comprises one or more processors and one or more memories coupled with the one or more processors, the processing system configured to cause the apparatus to:
receive a first configuration of a set of resources that are semi-persistently scheduled according to a first periodicity from a set of defined periodicities;
select a first resource of the set of resources for a first instance of a first semi-persistently scheduled transmission within a first period associated with a second periodicity, wherein the second periodicity is different than the first periodicity and is based at least in part on a traffic pattern of communications by the UE, the first semi-persistently scheduled transmission being associated with the second periodicity; and
transmit or receive the first instance of the first semi-persistently scheduled transmission using the first resource of the set of resources.

2. The apparatus of claim 1, wherein the processing system is further configured to cause the apparatus to:
select an earliest resource of the set of resources after a start of the first period associated with the second periodicity; or
select a random resource from a subset of the set of resources within the first period associated with the second periodicity in accordance with a random seed.

3. The apparatus of claim 1, wherein the processing system is further configured to cause the apparatus to:
receive a second configuration of the second periodicity and a first offset associated with the first semi-persistently scheduled transmission, the first offset comprising a difference between a first starting point of a first period associated with the first periodicity and a second starting point of the first period associated with the second periodicity.

4. The apparatus of claim 3, wherein the processing system is further configured to cause the apparatus to:
receive a third configuration of a second set of resources that are semi-persistently scheduled according to a third periodicity;
receive a fourth configuration of a fourth periodicity and a second offset associated with a second semi-persistently scheduled transmission;
select a first resource of the second set of resources for a first instance of the second semi-persistently scheduled transmission within a first period associated with the fourth periodicity; and
transmit or receive the first instance of the second semi-persistently scheduled transmission using the first resource of the second set of resources.

5. The apparatus of claim 4, wherein the processing system is further configured to cause the apparatus to:
select an earliest resource of the second set of resources after a start of the first period associated with the fourth periodicity; or
select a random resource from a subset of the second set of resources within the first period associated with the fourth periodicity in accordance with a random seed.

6. The apparatus of claim 4, wherein the second offset comprises a difference between a starting point of a first period associated with the third periodicity and a starting point of the first period associated with the fourth periodicity.

7. The apparatus of claim 3, wherein the processing system is further configured to cause the apparatus to:
receive a third configuration of a third periodicity and a second offset associated with a second semi-persistently scheduled transmission;
select a second resource of the set of resources for a first instance of the second semi-persistently scheduled transmission within a first period associated with the third periodicity; and
transmit or receive the first instance of the second semi-persistently scheduled transmission using the second resource of the set of resources.

8. The apparatus of claim 7, wherein the processing system is further configured to cause the apparatus to:
select a next available resource from the set of resources after a start of the first period associated with the third periodicity.

9. The apparatus of claim 8, wherein the processing system is further configured to cause the apparatus to:
select an earliest resource of the set of resources after any resource of the set of resources selected for an instance of the first semi-persistently scheduled transmission in accordance with a first index of a first device of the UE associated with the first semi-persistently scheduled transmission being less than a second index of a second device of the UE associated with the second semi-persistently scheduled transmission.

10. The apparatus of claim 8, wherein the processing system is further configured to cause the apparatus to:
receive an indication of a first timing of the first period associated with the second periodicity and an indication of a second timing of the first period associated with the third periodicity; and
select a next earliest resource after an earliest resource of the set of resources in accordance with the first timing being an earlier timing of the first timing and the second timing and in accordance with the earliest resource of the set of resources after the start of the first period associated with the third periodicity being occupied for an instance of the first semi-persistently scheduled transmission.

11. The apparatus of claim 7, wherein:
the first resource and the second resource are frequency division multiplexed within a first slot;
the first resource and the second resource are time division multiplexed within a first slot; or
the first resource and the second resource are time division multiplexed in a pair of continuous slots.

12. The apparatus of claim 7, wherein the second offset comprises a difference between a first starting point of a first period associated with the first periodicity and a second starting point of the first period associated with the third periodicity.

13. An apparatus for wireless communication at a network device, comprising:
a processing system that comprises one or more processors and one or more memories coupled with the one or more processors, the processing system configured to cause the apparatus to:
transmit a first configuration of a set of resources that are semi-persistently scheduled according to a first periodicity from a set of defined periodicities;
select a first resource of the set of resources for a first instance of a first semi-persistently scheduled transmission within a first period associated with a second periodicity, wherein the second periodicity is different than the first periodicity and is based at least in part on a traffic pattern of communications by a user equipment (UE), the first semi-persistently scheduled transmission being associated with the second periodicity; and transmit or receive the first instance of the first semi-persistently scheduled transmission using the first resource of the set of resources.

14. The apparatus of claim 13, wherein the processing system is further configured to cause the apparatus to:

select an earliest resource of the set of resources after a start of the first period associated with the second periodicity; or select a random resource from a subset of the set of resources within the first period associated with the second periodicity in accordance with a random seed.

15. The apparatus of claim 13, wherein the processing system is further configured to cause the apparatus to:

transmit a second configuration of the second periodicity and a first offset associated with the first semi-persistently scheduled transmission, the first offset comprising a difference between a first starting point of a first period associated with the first periodicity and a second starting point of the first period associated with the second periodicity.

16. The apparatus of claim 15, wherein the processing system is further configured to cause the apparatus to:

transmit a third configuration of a second set of resources that are semi-persistently scheduled according to a third periodicity;

transmit a fourth configuration of a fourth periodicity and a second offset associated with a second semi-persistently scheduled transmission;

select a first resource of the second set of resources for a first instance of the second semi-persistently scheduled transmission within a first period associated with the fourth periodicity; and transmit or receive the first instance of the second semi-persistently scheduled transmission using the first resource of the second set of resources.

17. The apparatus of claim 16, wherein the processing system is further configured to cause the apparatus to:

select an earliest resource of the second set of resources after a start of the first period associated with the fourth periodicity; or select a random resource from a subset of the second set of resources within the first period associated with the fourth periodicity in accordance with a random seed.

18. The apparatus of claim 16, wherein the second offset comprises a difference between a start of a first period associated with the third periodicity and a start of the first period associated with the fourth periodicity.

19. The apparatus of claim 15, wherein the processing system is further configured to cause the apparatus to:

transmit a third configuration of a third periodicity and a second offset associated with a second semi-persistently scheduled transmission;

select a second resource of the set of resources for a first instance of the second semi-persistently scheduled transmission within a first period associated with the third periodicity; and transmit or receive the first instance of the second semi-persistently scheduled transmission using the second resource of the set of resources.

20. The apparatus of claim 19, wherein the processing system is further configured to cause the apparatus to:

select a next available resource from the set of resources after a start of the first period associated with the third periodicity.

21. The apparatus of claim 20, wherein the processing system is further configured to cause the apparatus to:

select an earliest resource of the set of resources after any resource of the set of resources selected for an instance of the first semi-persistently scheduled transmission in accordance with a first index of a first device of a user equipment (UE) associated with the first semi-persistently scheduled transmission being less than a second index of a second device of the UE associated with the second semi-persistently scheduled transmission.

22. The apparatus of claim 20, wherein the processing system is further configured to cause the apparatus to:

transmit an indication of a first timing of the first period associated with the second periodicity and an indication of a second timing of the first period associated with the third periodicity; and select a next earliest resource after an earliest resource of the set of resources in accordance with the first timing being an earlier timing of the first timing and the second timing and in accordance with the earliest resource of the set of resources after the start of the first period associated with the third periodicity being occupied for an instance of the first semi-persistently scheduled transmission.

23. The apparatus of claim 19, wherein:

the first resource and the second resource are frequency division multiplexed within a first slot;

the first resource and the second resource are time division multiplexed within a first slot; or the first resource and the second resource are time division multiplexed in a pair of continuous slots.

24. The apparatus of claim 19, wherein the second offset comprises a difference between a first starting point of a first period associated with the first periodicity and a second starting point of the first period associated with the third periodicity.

25. A method for wireless communications at an apparatus of a user equipment (UE), comprising:

receiving a first configuration of a set of resources that are semi-persistently scheduled according to a first periodicity from a set of defined periodicities;

selecting a first resource of the set of resources for a first instance of a first semi-persistently scheduled transmission within a first period associated with a second periodicity, wherein the second periodicity is different than the first periodicity and is based at least in part on a traffic pattern of communications by the UE, the first semi-persistently scheduled transmission being associated with the second periodicity; and transmitting or receiving the first instance of the first semi-persistently scheduled transmission using the first resource of the set of resources.

26. The method of claim 25, wherein selecting the first resource of the set of resources for the first instance of the first semi-persistently scheduled transmission within the first period associated with the second periodicity comprises:

selecting an earliest resource of the set of resources after a start of the first period associated with the second periodicity.

27. The method of claim 25, wherein selecting the first resource of the set of resources for the first instance of the first semi-persistently scheduled transmission within the first period associated with the second periodicity comprises:

selecting a random resource from a subset of the set of resources within the first period associated with the second periodicity in accordance with a random seed.

28. A method for wireless communications at an apparatus of a network device, comprising:

transmitting a first configuration of a set of resources that are semi-persistently scheduled according to a first periodicity from a set of defined periodicities;

selecting a first resource of the set of resources for a first instance of a first semi-persistently scheduled transmission within a first period associated with a second periodicity, wherein the second periodicity is different than the first periodicity and is based at least in part on a traffic pattern of communications by a user equipment (UE), the first semi-persistently scheduled transmission being associated with the second periodicity; and

52 transmitting or receiving the first instance of the first semi-persistently scheduled transmission using the first resource of the set of resources.

29. The method of claim 28, wherein selecting the first resource of the set of resources for the first instance of the first semi-persistently scheduled transmission within the first period associated with the second periodicity comprises:

selecting an earliest resource of the set of resources after a start of the first period associated with the second periodicity.

30. The method of claim 28, wherein selecting the first resource of the set of resources for the first instance of the first semi-persistently scheduled transmission within the first period associated with the second periodicity comprises:

selecting a random resource from a subset of the set of resources within the first period associated with the second periodicity in accordance with a random seed.

* * * * *